(12) United States Patent  
Oya et al.

(10) Patent No.: US 7,421,727 B2  
(45) Date of Patent: Sep. 2, 2008

(54) MOTION DETECTING SYSTEM, MOTION DETECTING METHOD, MOTION DETECTING APPARATUS, AND PROGRAM FOR IMPLEMENTING THE METHOD

(75) Inventors: Takashi Oya, Kanagawa (JP); Tomoaki Kawai, Kanagawa (JP)

(73) Assignee: Canon Kabushiki Kaisha (JP)

( * ) Notice: Subject to any disclaimer, the term of this patent is extended or adjusted under 35 U.S.C. 154(b) by 695 days.

(21) Appl. No.: 10/778,677

(22) Filed: Feb. 13, 2004

(65) Prior Publication Data

US 2004/0227817 A1 Nov. 18, 2004

(30) Foreign Application Priority Data

Feb. 14, 2003 (JP) ............................ 2003-037237  
Feb. 14, 2003 (JP) ............................ 2003-037238

(51) Int. Cl.  
*H04N 7/18* (2006.01)  
*H04N 7/173* (2006.01)  
*H04N 5/225* (2006.01)

(52) U.S. Cl. .................. 725/105; 348/155; 348/169

(58) Field of Classification Search ................ 348/155, 348/143, 211.3, 207.1, 154, 169; 396/153; 725/105  
See application file for complete search history.

(56) References Cited

U.S. PATENT DOCUMENTS

| 6,271,752 | B1 * | 8/2001 | Vaios .......................... 340/541 |
| 6,456,321 | B1 * | 9/2002 | Ito et al. .................... 348/143 |
| 6,504,479 | B1 * | 1/2003 | Lemons et al. ............... 340/541 |
| 6,512,537 | B1 * | 1/2003 | Shimizu et al. .............. 348/155 |
| 6,583,813 | B1 * | 6/2003 | Enright et al. ............... 348/150 |
| 6,856,343 | B2 * | 2/2005 | Arazi et al. .................. 348/143 |
| 6,867,799 | B2 * | 3/2005 | Broemmelsiek ............ 348/169 |
| 6,912,429 | B1 * | 6/2005 | Bilger ......................... 700/19 |
| 6,961,082 | B2 * | 11/2005 | Miura et al. ............. 348/211.9 |
| 7,075,567 | B2 * | 7/2006 | Hunter et al. .......... 348/208.13 |
| 7,106,333 | B1 * | 9/2006 | Milinusic ................... 345/474 |
| 7,124,427 | B1 * | 10/2006 | Esbensen .................... 725/109 |
| 7,136,106 | B1 * | 11/2006 | Shinohara et al. ........ 348/423.1 |
| 7,231,654 | B2 * | 6/2007 | Murai ........................ 725/105 |
| 2002/0163577 | A1 * | 11/2002 | Myers ........................ 348/152 |

FOREIGN PATENT DOCUMENTS

| JP | 10040185 A | 2/1998 |
| JP | 11041589 A | 2/1999 |
| JP | 2003259341 A | 9/2003 |
| JP | 2003259360 A | 9/2003 |

* cited by examiner

*Primary Examiner*—Nhan T. Tran  
*Assistant Examiner*—Pritham Prabhakher  
(74) *Attorney, Agent, or Firm*—Rossi, Kimms & McDowell LLP

(57) ABSTRACT

A motion detecting system which can set a proper set value for motion detection processing carried out by a camera server through a setting terminal. A setting terminal is connected to a camera server via a network for communication with each other. In the camera server, first motion detection processing is carried out for detecting a variation in an image taken by a camera based on a first set value. In the setting terminal, second motion detection processing is carried out on the taken image acquired based on a second set value via the network. The second set value is transmitted to the camera server so as to change the first set value according to a result of the second motion detection processing.

19 Claims, 31 Drawing Sheets

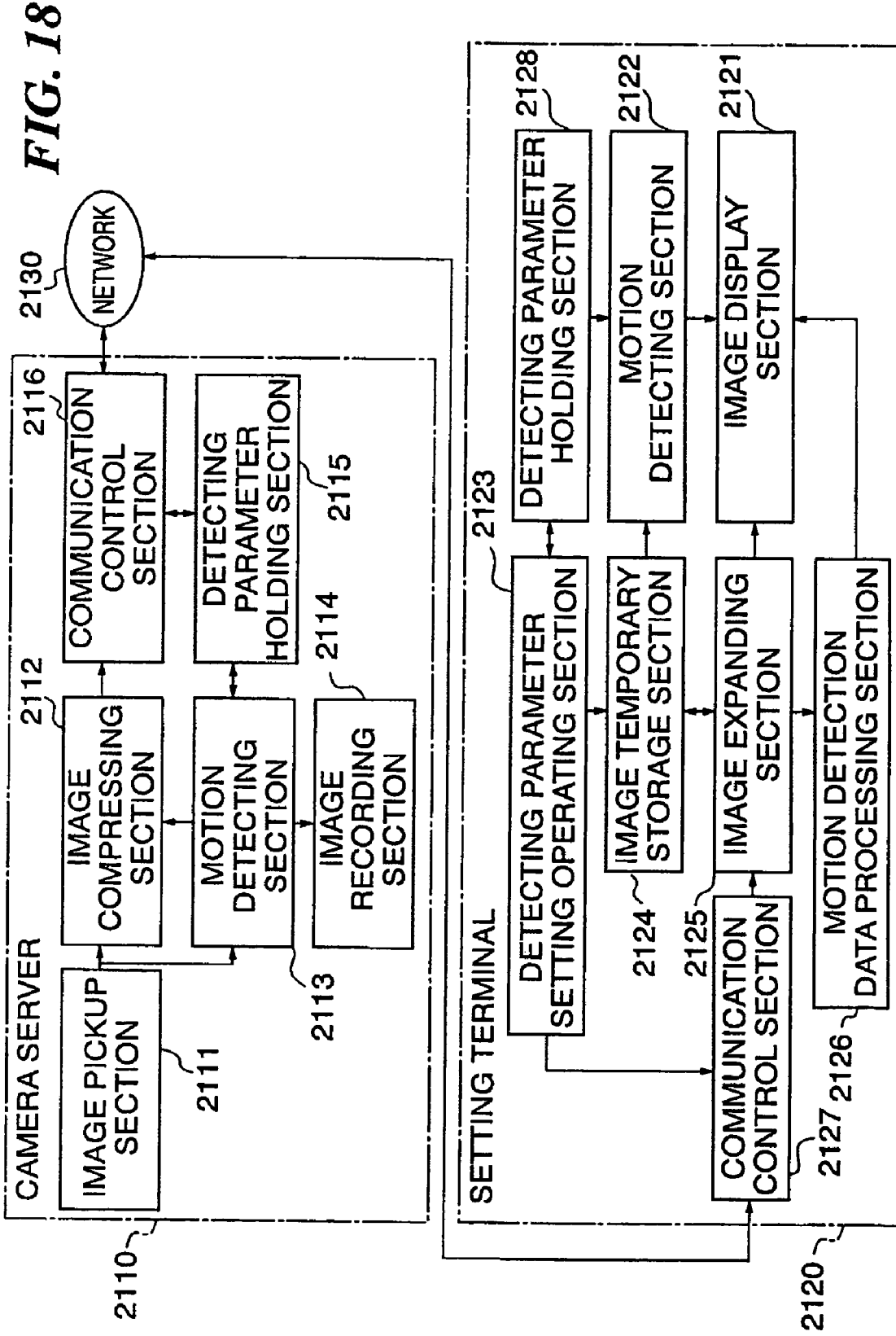

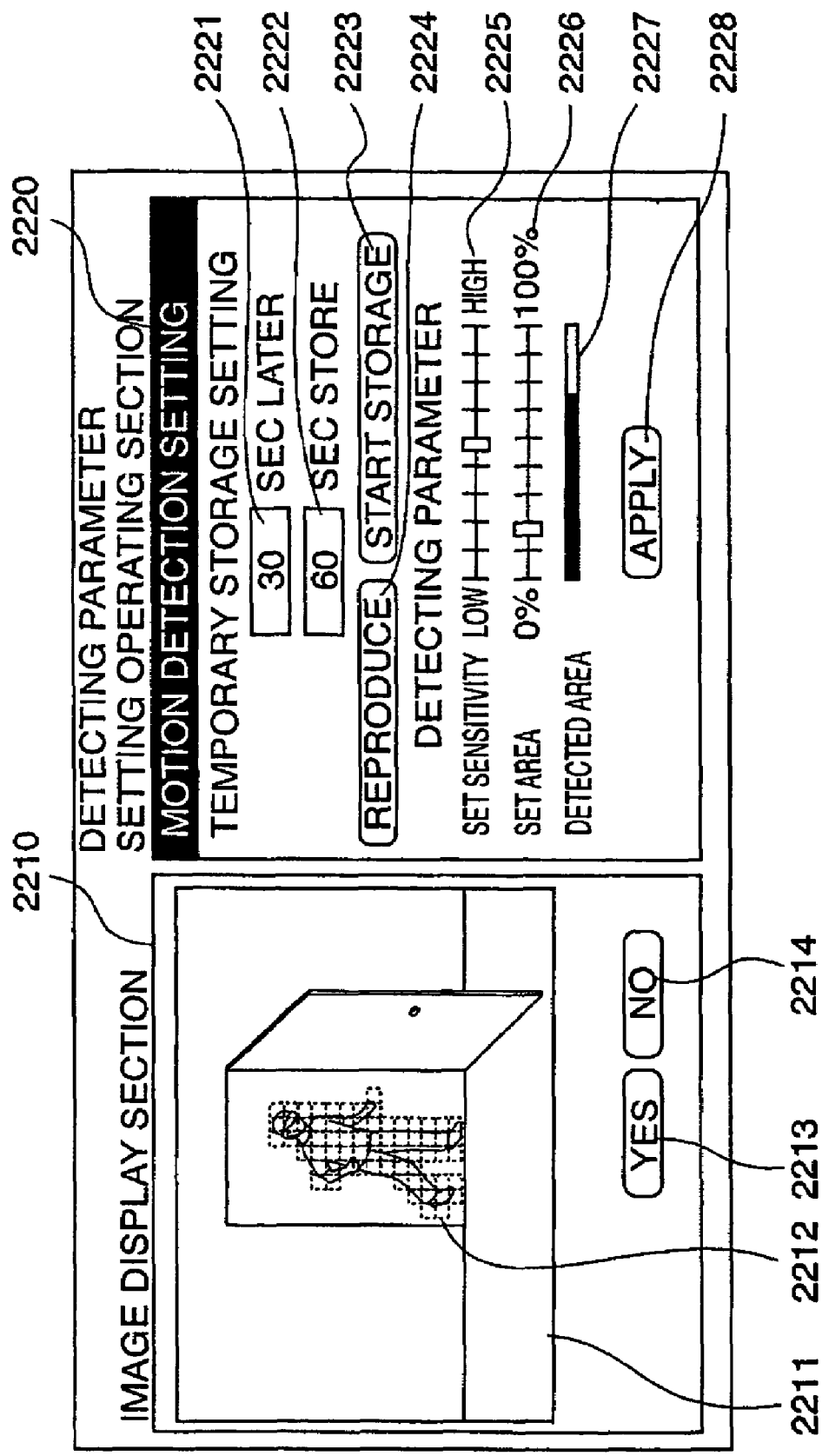

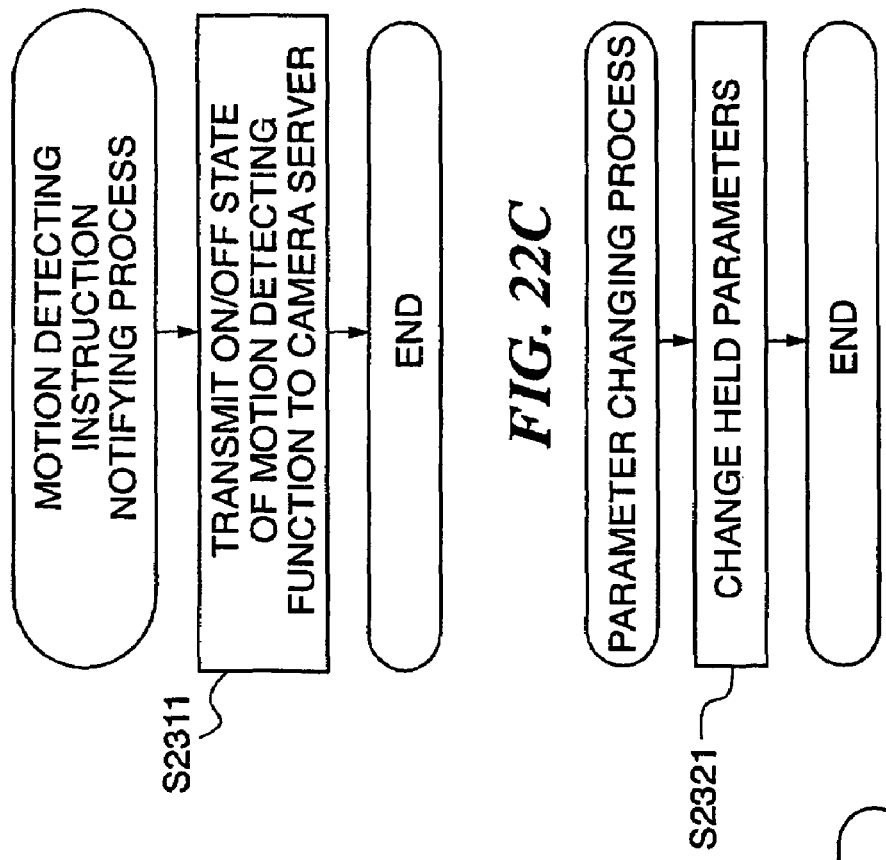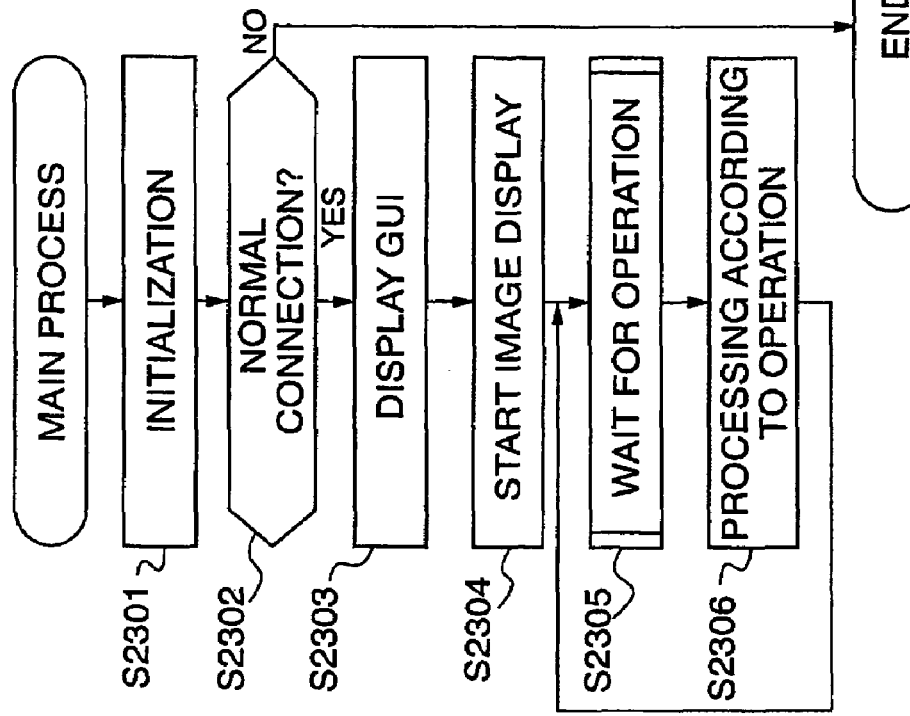

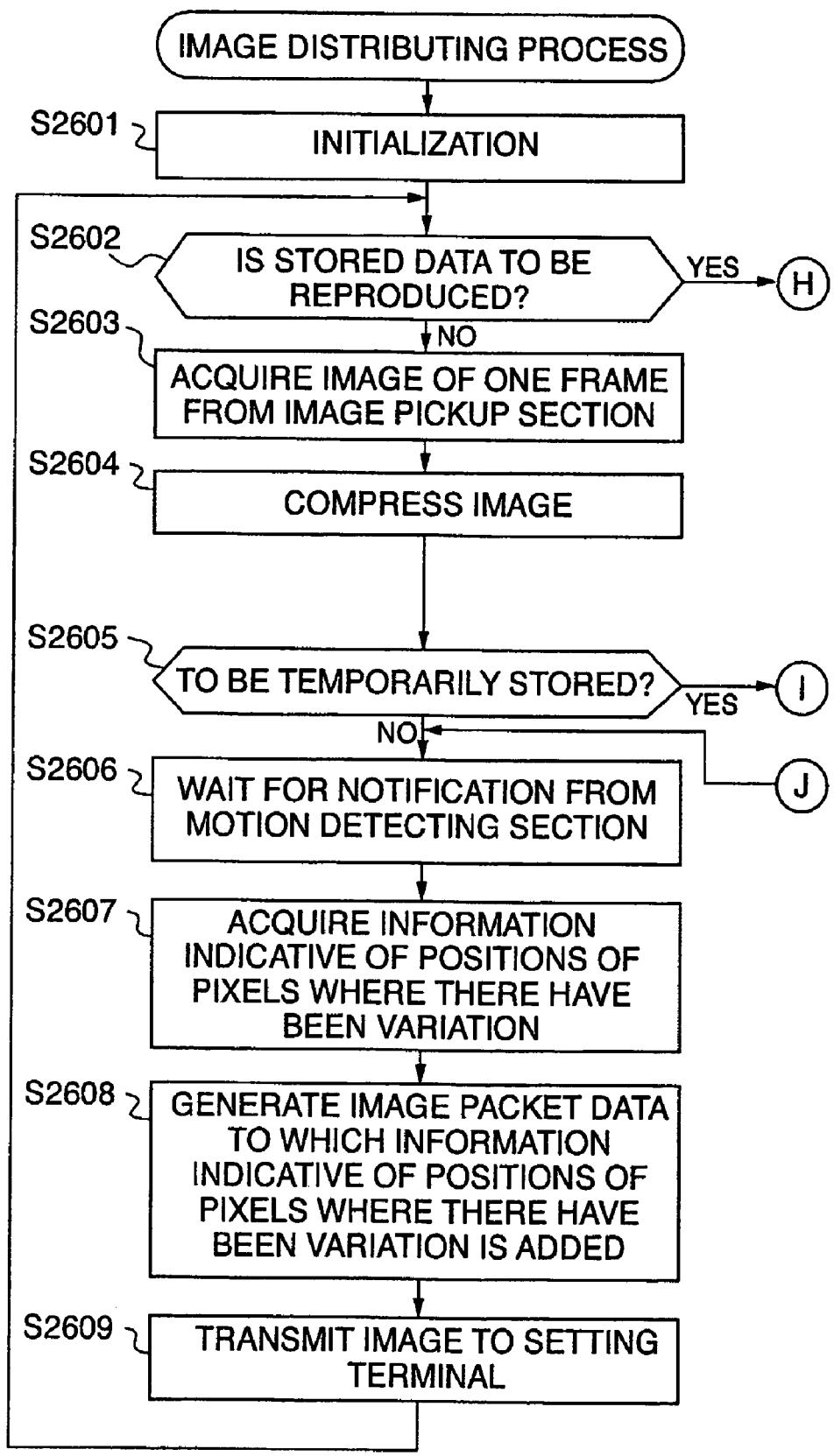

MOTION DETECTING SYSTEM, MOTION DETECTING METHOD, MOTION DETECTING APPARATUS, AND PROGRAM FOR IMPLEMENTING THE METHOD

BACKGROUND OF THE INVENTION

1. Field of the Invention

The present invention relates to a motion detecting system including a setting terminal connected to a camera server, to which a camera is connected, via a network such that they can communicate with each other, a motion detecting method, a motion detecting apparatus, as well as a program for implementing the method.

Also, the present invention relates to a camera setting apparatus connected to a camera device and a camera setting method which capture a taken image and carries out motion detection processing to detect a motion of an object in the captured image according to set various parameters, and a program for implementing the method.

2. Description of the Related Art

Conventionally, there has been known a monitoring system which acquires an image taken by a camera via a network and displays the same. In this system, a so-called camera server such as a camera with network terminals, and a set top box with a camera image input interface and a network interface is used. Furthermore, this system is equipped with a web browser with which the operator can set the camera server via the network. Examples of the camera server include a camera server with a function of detecting a variation in an image and operating an alarm device, a camera server with a function of storing images, and a camera server with a function of transmitting e-mails.

To configure motion detecting functions, a region subjected to motion detection processing is specified on an image, and the sensitivity at which a motion of an objects in a captured image is detected is set at a plurality of levels, so that a motion in the image can be detected according to which level corresponds to the amount of the detected motion.

By the way, a surveillance system for crime-prevention has a function of switching between a large number of cameras and a function of recording images for a long time, as well as the above described motion detecting function. In general, this system is configured by a special console.

This is because it is difficult to properly set a plurality of setting items in the case where the motion detecting function of a camera server is configured via a network. In many cases, a camera server and a camera are installed at locations remote from a setting terminal, and hence to configure the motion detecting function, persons must be located at respective locations where the camera and the setting terminal are installed.

SUMMARY OF THE INVENTION

It is a first of the present invention to provide a motion detecting system, a motion detecting method, and a motion detecting apparatus which can set a proper set value for a motion detection processing carried out by a camera server through a setting terminal, as well as a program for implementing the motion detecting method.

It is a second object of the present invention to provide a camera setting apparatus and a camera setting method which can easily set proper motion detecting parameters for a camera device without the need of carrying out additional operations, as well as a program for implementing the camera setting method.

To attain the above first object, in a first aspect of the present invention, there is provided a motion detecting system comprising a network, a camera server, and a setting terminal connected to the camera server for communication with each other, the camera server comprises a first motion detecting device that carries out first motion detection processing for detecting a variation in an image taken by a camera based on a first set value, and the setting terminal comprises an image acquisition device that acquires the image taken by the camera from the camera server via the network, a second motion detecting device that carries out second motion detection processing on the image acquired by the image acquisition device based on a second set value, and a set value changing device that transmits the second set value to the camera server so as to change the first set value according to a result of the second motion detection processing carried out by the second motion detecting device.

According to the first aspect of the present invention, the setting terminal transmits the second set value to the camera server via the network so as to change the first set value according to the result of the second motion detection processing carried out by the second motion detecting device. As a result, the setting terminal can set a proper set value for motion detection processing, which is carried out by the camera server, to the camera server.

Preferably, the setting terminal comprises a detection result acquisition device that acquires a result of the first motion detection processing carried out by the camera server via the network, and a display device that selectively displays one of the result of the first motion detection processing acquired by the detection result acquisition device and the result of the second motion detection processing.

More preferably, the setting terminal comprises a display nullifying device that nullifies display of the result of the second motion detection processing carried out by the display device when the setting terminal and the camera server are different in frame rate from each other.

Also preferably, the setting terminal comprises a detection result acquisition device that acquires a result of the first motion detection processing carried out by the camera server via the network, and a display device that simultaneously displays the result of the first motion detection processing acquired by the detection result acquisition device and the result of the second motion detection processing.

Also preferably, the first motion detecting device of the camera server carries out the first motion detection processing in accordance with a specified schedule, and the setting terminal comprises a display device that displays a result of the first motion detection processing, a schedule specifying device that specifies a schedule for the first motion detection processing via the network, and a display nullifying device operable when a present time is outside a range of the schedule specified for the first motion detection processing, to nullify display of the result of the first motion detection processing carried out by the first motion detecting device, the display being carried out by the display device.

More preferably, the setting terminal comprises a forced operation requesting device that requests the camera server, via the network, to ignore the schedule specified for the first motion detection processing and to force the first motion detecting device to carry out the first motion detection processing, and the camera server comprises a forcing device that forces the first motion detecting device to carry out the first motion detection processing in accordance with a request from the forced operation requesting device.

Further preferably, the set value changing device is operable when the forced operation requesting device makes the request, to change the first set value used by the camera server.

Also preferably, the setting terminal comprises a setting device that sets a time at which an image is acquired so as to carry out the first motion detection processing on the image based on the first set value, and a period of time for which the image is acquired.

To attain the above first object, in a second aspect of the present invention, there is provided a motion detecting method using a setting terminal connected to a camera server for communication with each other, comprising a first motion detecting step of causing the camera server to carry out first motion detection processing for detecting a variation in an image taken by a camera based on a first set value, an image acquisition step of causing the setting terminal to acquire the image taken by the camera from the camera server via the network, a second motion detecting step of causing the setting terminal to carry out second motion detection processing on the image acquired in the image acquisition step based on a second set value, a set value changing step of causing the setting terminal to change the first set value according to a result of the second motion detection processing carried out in the second motion detecting step, and a transmitting step of causing the setting terminal to transmit the second set value changed in the set value changing step to the camera server via the network.

Preferably, the motion detecting method comprises a detection result acquisition step of causing the setting terminal to acquire a result of the first motion detecting step carried out by the camera server via the network, and a display step of causing the setting terminal to selectively display one of the result of the first motion detection processing acquired in the detection result acquisition step and the result of the second motion detection processing carried out in the second motion detecting step.

More preferably, the motion detecting method comprises a display nullifying step of causing the setting terminal to nullify display of the result of the second motion detection processing carried out in the display step when the setting terminal and the camera server are different in frame rate from each other.

Also preferably, the motion detecting method comprises a detection result acquisition step of causing the setting terminal to acquire a result of the first motion detection processing carried out by the camera server via the network, and a display step of causing the setting terminal to simultaneously display the result of the first motion detection processing acquired in the detection result acquisition step and the result of the second motion detection processing.

Also preferably, in the first motion detecting step executed by the camera server, the first motion detection processing is carried out in accordance with a specified schedule, and the motion detecting method comprises a display step of causing the setting terminal to display a result of the first motion detection processing, a schedule specifying step of causing the setting terminal to specify a schedule for the first motion detection processing via the network, and a display nullifying step of causing the setting terminal to nullify display of the result of the first motion detection processing carried out in the first motion detecting step, the display being carried out in the display step, when a present time is outside a range of the schedule specified for the first motion detection processing.

More preferably, the motion detecting method comprises a forced operation requesting step of causing the setting terminal to request the camera server, via the network, to ignore the schedule specified for the first motion detection processing in the first motion detecting step and to be forced to carry out the first motion detection processing, and a forcing step of forcing the camera server to carry out the first motion detection processing in accordance with a request in the forced operation requesting step.

Further preferably, when the request is made in the forced operation requesting step, the first set value is changed in the set value changing step.

Also preferably, the motion detecting method comprises a setting device of causing the setting terminal to set a time at which an image is acquired so as to carry out the first motion detection processing on the image based on the first set value, and a period of time for which the image is acquired.

To attain the above second object, in a third aspect of the present invention, there is provided a motion detecting apparatus that sets parameters enabling a camera server to detect a variation in an image taken by a camera, comprising an acquisition device that acquires the image taken by the camera and a result of detection of a variation in the image based on a first set value from the camera server, a display device that displays the image acquired by the acquisition device together with the result of detection of a variation in the image based on the first set value, a processing device that carries out detection of a variation in the image acquired by the acquisition device based on a second set value, and a set value changing device that transmits the second set value to the camera server so as to change the first set value to the second set value.

According to the third aspect of the present invention, it is possible to easily set proper motion detecting parameters for a camera without the need of carrying out additional operations.

Preferably, the motion detecting apparatus further comprises a setting device that sets a time at which an image is acquired so as to carry out the detection of a variation in the image, and a period of time for which the image is acquired.

To attain the above second object, in a fourth aspect of the present invention, there is provided a program for executing a motion detecting method for setting parameters enabling a camera server to detect a variation in an image taken by a camera, comprising an acquisition module for acquiring the image taken by the camera and a result of detection of a variation in the image based on a first set value from the camera server, a display module for displaying the image acquired by the acquisition module together with the result of detection of a variation in the image based on the first set value, a processing module for carrying out detection of a variation in the image acquired by the acquisition module based on a second set value, and a set value changing module for transmitting the second set value to the camera server so as to change the first set value to the second set value.

To attain the above second object, in a fifth aspect of the present invention, there is provided a storage medium storing a program according to the fourth aspect of the present invention.

It should be noted that the first and second set values used for the first and second motion detection processing, respectively, include threshold values of parameters for determining a change in an image, and the parameters may include sensitivity, area ratio, and duration.

The above and other objects, and advantages of the invention will become more apparent from the following detailed description taken in conjunction with the accompanying drawings.

BRIEF DESCRIPTION OF THE DRAWINGS

FIG. 18 is a block diagram showing the respective constructions of a camera server and a setting terminal appearing in FIG. 17;

FIG. 19 is a view showing an example of a user interface screen displayed in a detecting parameter setting operating section of the setting terminal appearing in FIG. 18;

FIG. 22A is a flow chart showing a main process carried out by the setting terminal;

FIG. 22B is a flow chart showing a motion detection instruction notifying process carried out by the setting terminal;

FIG. 22C is a flow chart showing a parameter changing process carried out by the setting terminal;

FIGS. 28A and 28B are flow chart showing an image distributing process carried out by a camera server appearing in FIG. 27;

DETAILED DESCRIPTION OF THE PREFERRED EMBODIMENTS

The present invention will now be described in detail with reference to the accompanying drawings showing preferred embodiments thereof.

Figure 1:
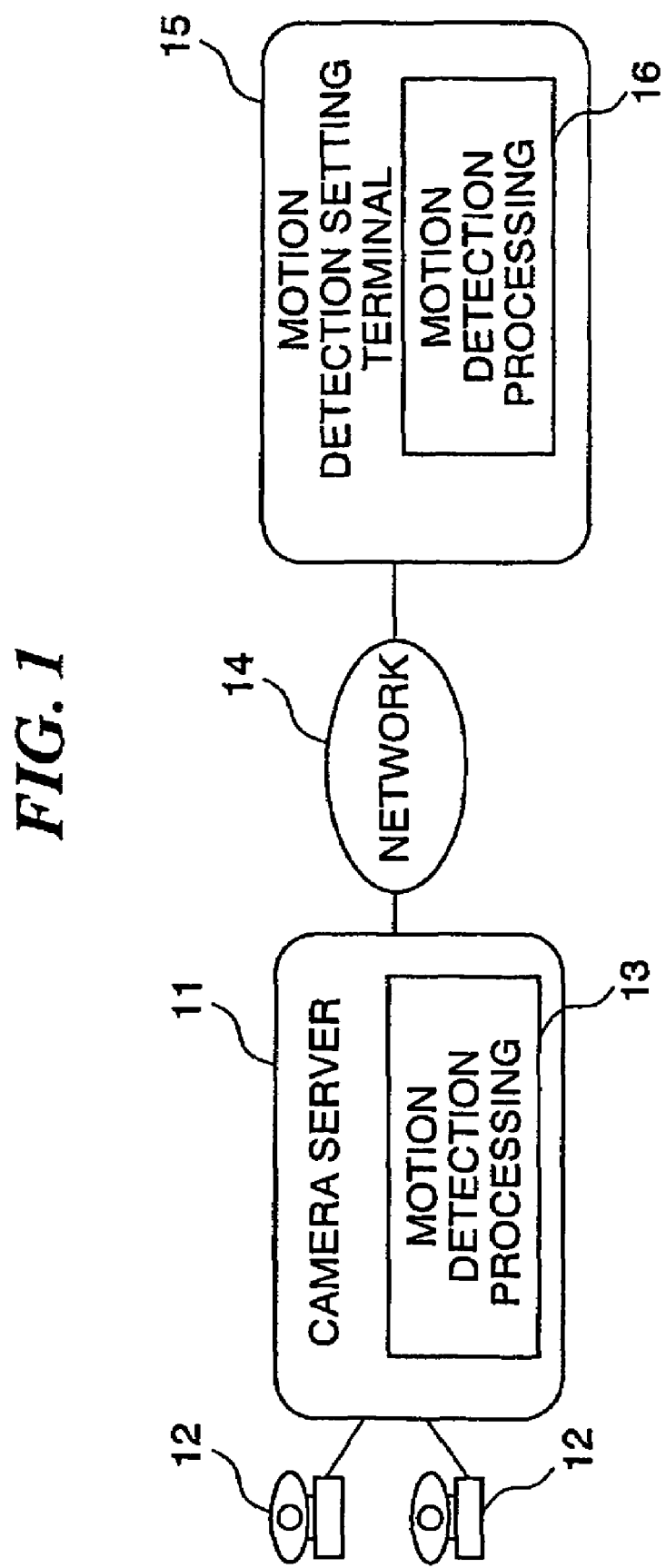
FIG. 1 is a block diagram showing the arrangement of a motion detection system according to a first embodiment of the present invention.

FIG. 1 is a block diagram showing the arrangement of a motion detection system according to a first embodiment of the present invention.

As shown in FIG. 1, the motion detection system is comprised of a camera server 11 to which a plurality of cameras 12 are connected, and a motion detection setting terminal (hereinafter referred to as the "setting terminal") 15. The camera server 11 and the setting terminal 15 are connected to each other via a network 14 such that they can communicate with each other. The network 14 is the Internet based on an IP protocol. Further, the network 14 should not necessarily be the Internet, but may be any transmission line insofar as it can transmit and receive digital signals and has a sufficient capacity for image communication.

The camera server 11 includes a motion detection processing section 13 which captures images taken by the respective cameras 12 and carries out processing for detecting a variation in each of the images. Further, the camera server 11 is capable of transmitting images taken by the respective cameras 12 and the result of processing carried out by the motion detection processing section 13 to the setting terminal 15 in accordance with a request from the setting terminal 15.

The setting terminal 15 includes a motion detection processing section 16 which carries out the same motion detection processing as the one carried out by the motion detection processing section 13 of the camera server 11. Specifically, the motion detection processing section 16 detects a motion of an object in an image transmitted from the camera server 11 based on the same set values as the ones of the motion detecting section 13. In an example described later, the set values relating to motion detection processing are threshold values of parameters for determining a change in an image, and the parameters are comprised of sensitivity, area ratio, and duration. The set values relating to motion detection processing may be arbitrarily changed through the setting terminal 15. Upon determination of a set value relating to motion detection processing according to the input by the user, the setting terminal 15 transmits the determined set value to the camera server 11. When receiving the set value transmitted from the setting terminal 15, the camera server 11 sets the received set value in the motion detection processing section 13. As a result, the motion detection processing section 13 carries out motion detection processing based on the set values determined by the setting terminal 15.

Here, in order that the setting terminal 15 may acquire images from the camera server 11, an URL encoded command is transmitted from the setting terminal 15 to the camera server 11 according to HTTP, and the camera server 11 returns images of a plurality of frames in response to the command. This method is known.

Figure 2:
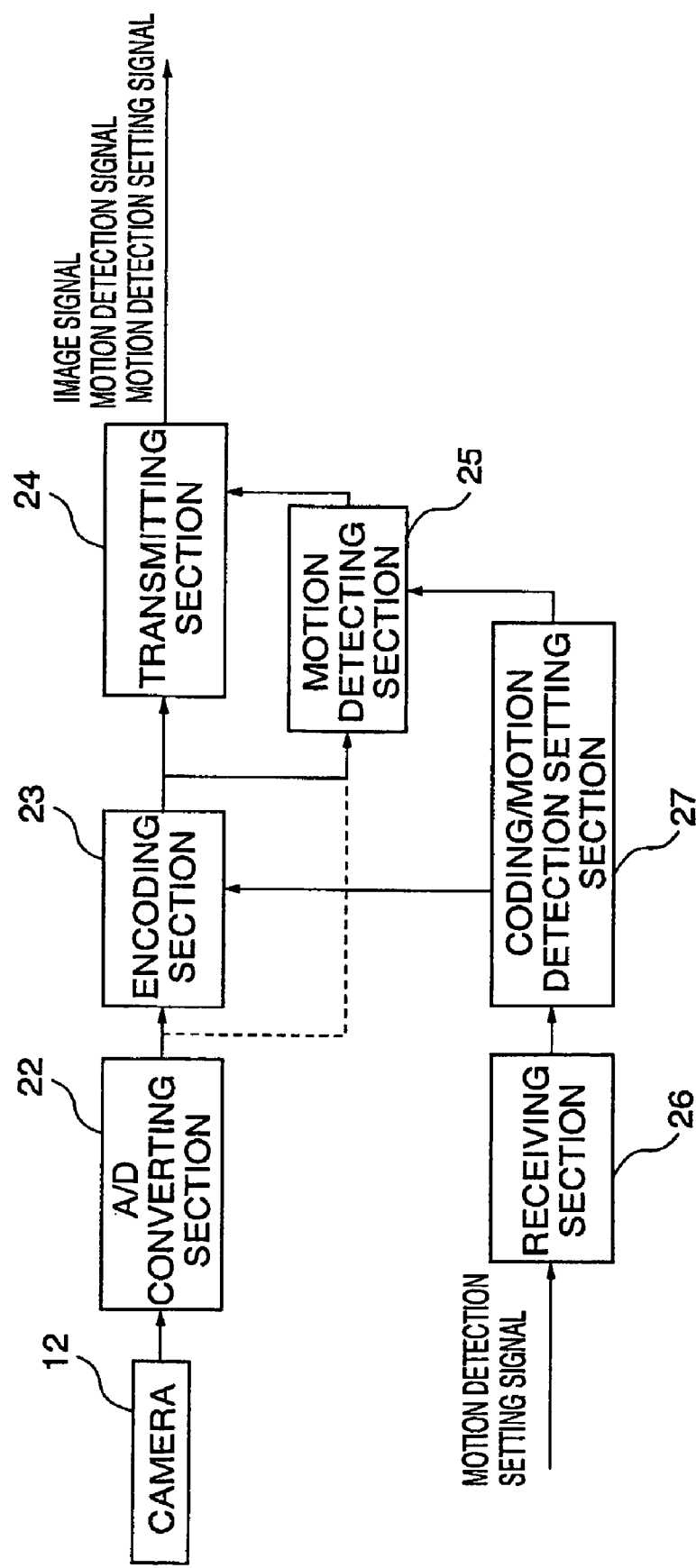
FIG. 2 is a block diagram showing the internal construction of a camera server appearing in FIG. 1.

A description will now be given of the internal construction of the camera server 11 with reference to FIG. 2. FIG. 2 is a block diagram showing the internal construction of the camera server 11 appearing in FIG. 1.

Examples of the hardware construction of the camera server 11 include a combination of a camera and a set top box, a camera built-in type, and a combination of a camera and a personal computer with an image input function, and such hardware constructions can easily be realized using known techniques. It should be noted that the present embodiment does not depend on the hardware construction of the camera server 11, and therefore description of the hardware construction is omitted. Thus, what is related to motion detection processing will now be described, and description of what is related to camera control, for example, is omitted.

As shown in FIG. 2, the camera server 11 is configured such that an image signal input from the camera 12 is converted to a digital image signal by an A/D converting section 22, and the digital image signal is encoded by an encoding section 23. The encoding section 23 carries out encoding in JPEG format, MPEG format, or the like. A motion detecting section 25 then carries out motion detection processing on the input image based on the set values. The encoded image signal, a motion detection signal indicative of the result of the motion detection processing, and a motion detection setting signal indicative of the present set values are transmitted from a transmitting section 24 in accordance with a request from the setting terminal 15.

The motion detecting section 25 carries out motion detection processing according to an adjacent frame difference or a background difference. For example, if motion detection processing is carried out according to the adjacent frame difference, the absolute value of a difference in brightness between pixels at the same coordinates, or the absolute value of a difference between values of JPEG DCT coefficient per block, and so forth are used as a characteristic quantity for the difference between adjacent frames, and when a value obtained by integrating absolute values as mentioned above for an image as a whole becomes equal to or greater than a predetermined threshold, it is determined that there has been a motion of an object in an image. Here, whether an image which has already been encoded or an image which has not yet been encoded is input to the motion detecting section 25 depends on what kind of difference method is adopted, and hence in FIG. 2, a solid line and a dotted line indicate the respective routes of an image input to the motion detecting section 25.

Although the present embodiment does not depend on the way of motion detection, it is assumed for the convenience of explanation that the adjacent frame difference method, in which the absolute value of a difference between values of JPEG DCT coefficient per block is obtained, is applied in the present embodiment. In this case, whether there has been a motion of an object in an image or not is determined according to three thresholds: sensitivity, area ratio, and duration. The threshold of sensitivity defines a threshold which is set such that when the sum of the absolute values of the difference between values of JPEG DCT coefficient in a block becomes equal to or greater than the threshold, it is determined that a variation has occurred in the block. The higher the sensitivity, the lower the threshold, to thereby enable detection of even a small motion. The threshold of area ratio defines a threshold which is set such that when the percentage of blocks where in which a motion have occurred in an image becomes greater than the threshold, it is determined that a motion has occurred. The threshold of duration defines a threshold a which is set such that when a motion detected according to the area ratio continues for a time period equal to or longer than the threshold, it is finally determined that a motion has occurred. If the motion continues for a period of time equal to or longer than the duration, this means that a motion detection event has occurred for the first time.

A variety of settings as to the coding method and the motion detection method can be changed through the setting terminal 15. Specifically, as shown in FIG. 2, a motion detection setting signal is transmitted from the setting terminal 15 via the network 14, and is received by a receiving section 26. The received motion detection setting signal is input to a coding/motion detecting setting section 27. The coding/motion detecting setting section 27 retrieves a set value for the motion detecting section 25 and a set value for the coding section 23 according to the input motion detection setting signal, and sets them in the respective ones of the motion detecting section 25 and the coding section 23.

Figure 3:
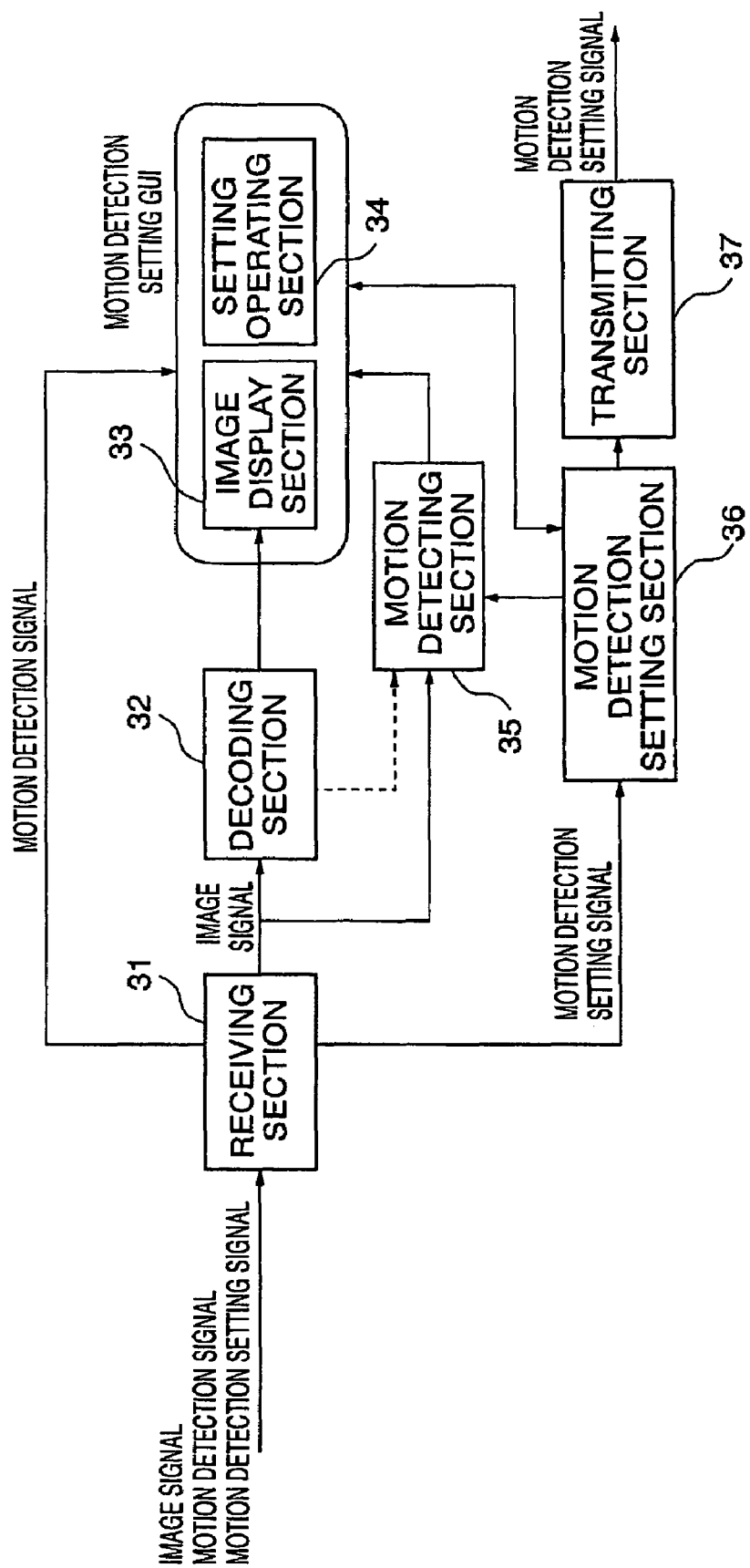
FIG. 3 is a block diagram showing the internal construction of a setting terminal appearing in FIG. 1.

A description will now be given of the internal construction of the setting terminal 15 with reference to FIG. 3. FIG. 3 is a block diagram showing the internal construction of the setting terminal 15.

The setting terminal 15 is implemented by e.g. application software installed on a personal computer. If the personal computer has a processing capacity enough to execute the application software, no specific hardware or operation software has to be used.

As shown in FIG. 3, the setting terminal 15 is configured such that when an image signal is received by a receiving section 31, it is decoded by a decoding section 32, and the decoded image is displayed in an image display section 33. Further, the received signal is transmitted to a motion detecting section 35, which then carries out motion detection processing according to the image signal. The result of the motion detection processing is displayed in the image display section 33 and a setting operating section 34. Here, the motion detecting section 35 carries out the same motion detection processing as the one carried out by the camera server 11. Whether an image which has not yet been decoded or an image which has already been decoded is used for the motion detection processing depends on the way of motion detection processing, and hence in FIG. 3, a solid line and a dotted line indicate the respective routes of an image which is input to the motion detecting section 35.

The receiving section 31 receives a motion detection signal and a motion detection setting signal transmitted from the camera server 11. The motion detection signal is indicative of the result of the motion detection processing, and is transmitted to and displayed in the image display section 33 and the setting operating section 34. The motion detection setting signal received by the received section 31 is indicative of set values used for motion detection processing, and is transmitted to a motion detection setting section 36. The motion detection setting section 36 sets the set values, which are indicated by the motion detection setting signal, as initial values for use by the motion detecting section 35.

To acquire the motion detection signal and the motion detection setting signal, a method implemented on TCP protocol, a method implemented on HTTP protocol, or the like may be used.

The setting operating section 34 is intended to enable an inputting operation for making motion detection settings. For example, the setting operating section 34 carries out an operation of designating a motion detection region on a displayed image and designating the detecting sensitivity. Upon designation of a certain item, a set value for this item is transmitted to the motion detection setting section 36. The motion detection setting section 36 sets the set value, which has been set by the setting operating section 34, in the motion detecting section 35. Also, the set value is transmitted as the motion detection setting signal to the camera server 11 via a transmitting section 37. The setting operating section 34 constitutes a motion detection setting GUI (Graphical User Interface) in cooperation with the image display section 33.

Figure 4:
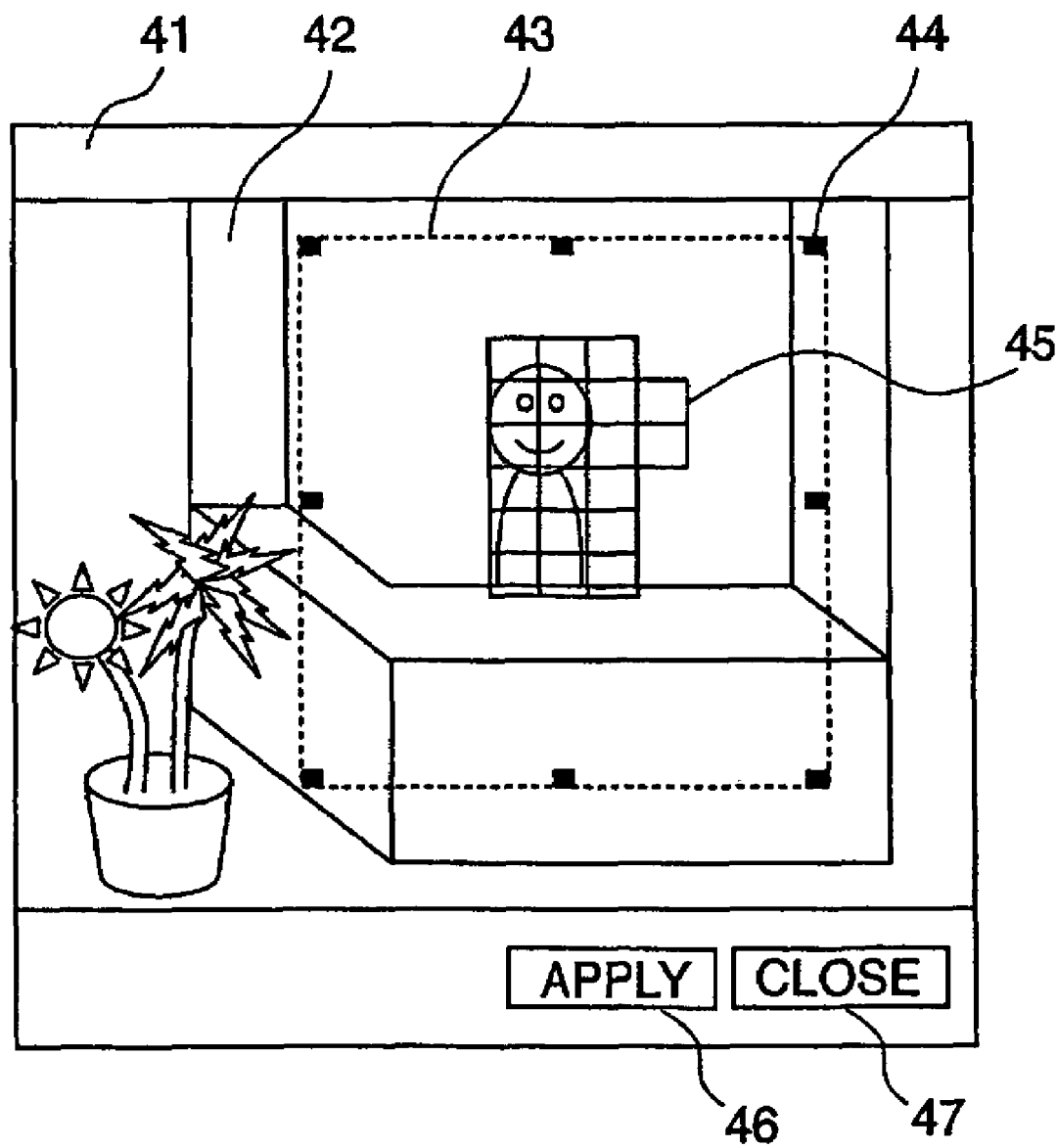
FIG. 4 is a view showing an example of a screen displayed in an image display section of the setting terminal.
Figure 5A:
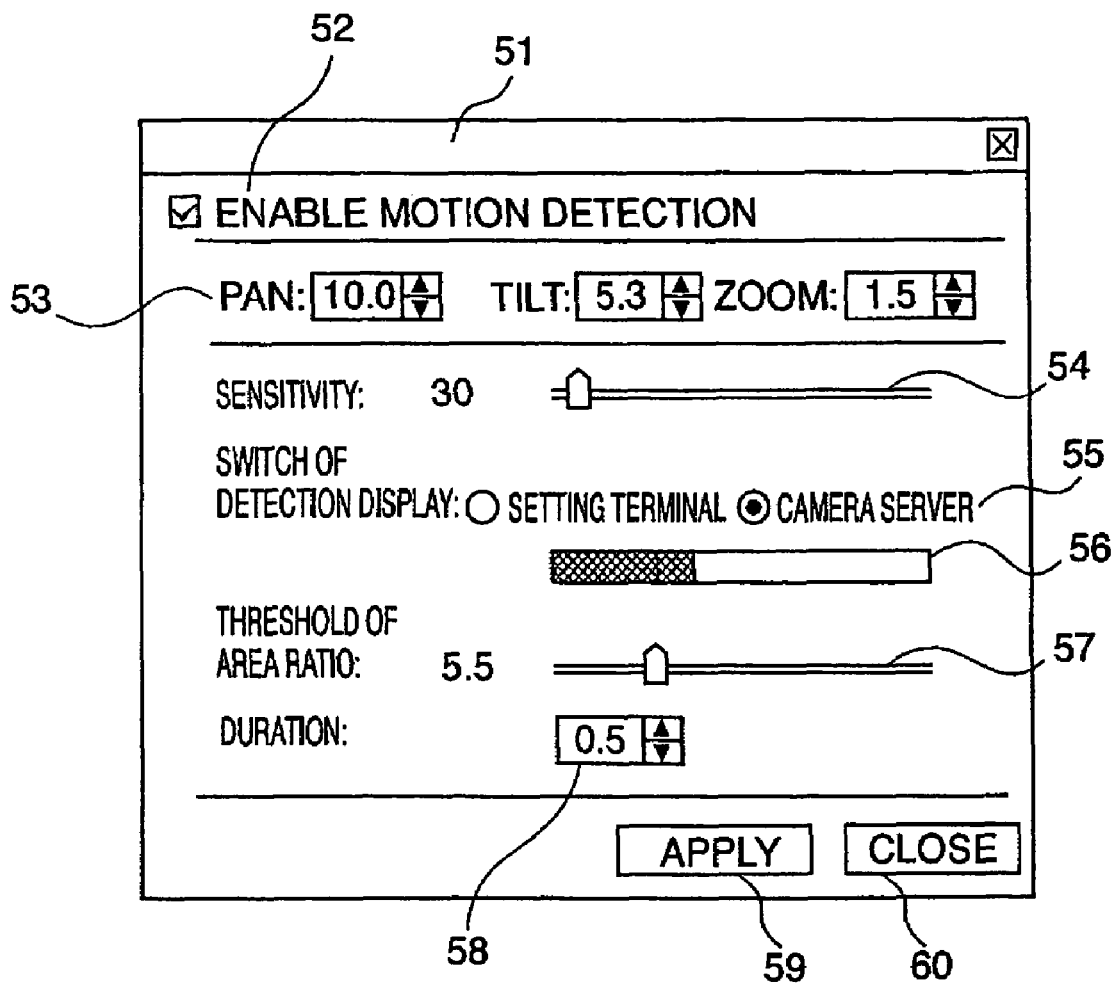
FIG. 5A is a view showing an example of a setting operating screen for making various settings for motion detection carried out by a setting operating section of the setting terminal appearing in FIG. 3.

A description will now be given of the motion detection setting GUI of the setting terminal 15 with reference to FIGS. 4 and 5. FIG. 4 is a view showing an example of a screen displayed in the image display section 33 of the setting terminal 15, FIG. 5A is a view showing an example of a setting operating screen for making various motion detection settings using the setting operating section 34 of the setting terminal 15 in FIG. 3, and FIG. 5B is a view showing a preset value set as a motion of setting by an edition box appearing in FIG. 5A.

The setting terminal 15 includes application software installed on a window system; the application software constitutes the motion detection setting GUI which is comprised of the setting operating section 34 and the image display section 33 as described above. The GUI causes a window as shown in FIG. 4, for example, to be displayed in the image display section 33. This window is comprised of a window frame 41 and a client region 42. An image received from the camera server 11 is displayed in the client region 42. A frame 43 indicative of a motion detecting object region is displayed in the displayed image. The size of the frame 43 can be changed by dragging a latch 44, for example, using a mouse cursor, not shown. The position of the frame 43 can also be changed by dragging the mouse cursor on the frame 43.

The motion detecting section 35 of the setting terminal 15 carries out motion detection processing on the image received from the camera server 11 and in the motion detecting object region specified by the frame 43. A location where a motion has occurred in the motion detecting object region is indicated as blocks 45. In the present embodiment, as described above, the motion detection processing is carried out per JPEG block as described above and hence a location where a motion has occurred is indicated in the form of blocks, but if a motion is detected per pixel, whether a motion has occurred or not may be indicated for each pixel. Further, an application button 46 for fixing the set motion detecting object region and a button 47 for closing the window are displayed at the bottom of the window. When the application button 46 is depressed, the motion detecting object region specified on the window is fixed and transmitted to the camera server 11.

A description will now be given of a setting operating screen for making various settings of motion detection processing by means of the setting operating section 34 with reference to FIGS. 5A and 5B.

As shown in FIG. 5A, a setting operating screen 51 for making various settings relating to motion detection processing is displayed in the setting terminal 15 through the operation of the setting operating section 34. As shown in FIG. 5A, the setting operating screen 51 includes a check box 52 for selecting whether to enable or disable the motion detecting function, an edition box 53 with UP/DOWN arrows for designating values of pan, tilt, and zoom in the case where a camera which can be controlled is subjected to the processing, a slide bar 54 for adjusting the sensitivity, a slide bar 57 for adjusting the threshold of area ratio, a display bar 56 for displaying in the form of a real time horizontal graph the present area ratio i.e. the ratio of a region where a motion has been detected to the motion detecting object region, an edition box 58 with UP/DOWN arrows for displaying/setting the duration, and a radio button 55 for selecting whether the result of motion detection processing carried out by the setting terminal 15 is to be displayed or the result of motion detection processing carried out by the camera server 11 is to be displayed in carrying out real-time display of the motion detection area ratio indicated by the display bar 56. When the slide bar 54 is slid, the value of sensitivity corresponding to the slid amount is displayed. When the slide bar 57 is slid, the threshold of area ratio corresponding to the slid amount is displayed. In the display bar 56, the currently set threshold of area ratio is displayed so that whether the area ratio has become greater than the threshold or not can be seen at a glance.

Further, an application button 59 for fixing various set values, and a button 60 for closing a window are displayed at the bottom of the window. When the application button 59 is depressed, the set values set on the window are fixed and transmitted to the camera server 11.

Figure 5B:
FIG. 5B is a view showing a preset value set as a variation of setting by an edition box appearing in FIG. 5A.

Although in the present embodiment, the respective values of pan, tilt, and zoom are directly designated using the edition box 53 with the UP/DOWN arrows, the present invention is not limited to this, but the values of pan, tilt, and zoom may be indirectly designated using a preset value 61, as shown in FIG. 5B, as a set of pan, tilt, and zoom values.

Figure 6:
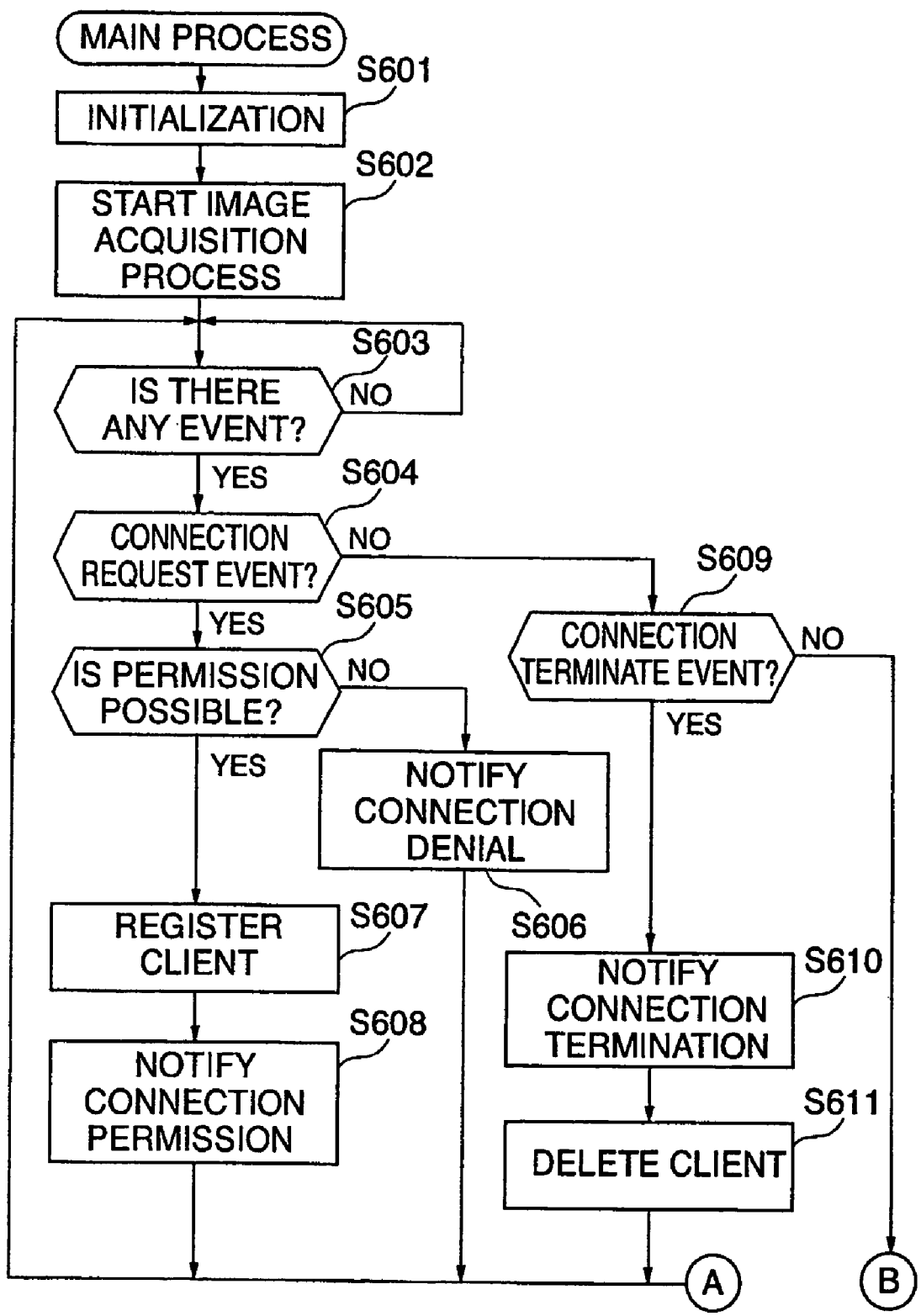
FIG. 6 is a flow chart showing a main process carried out by the camera server.
Figure 7:
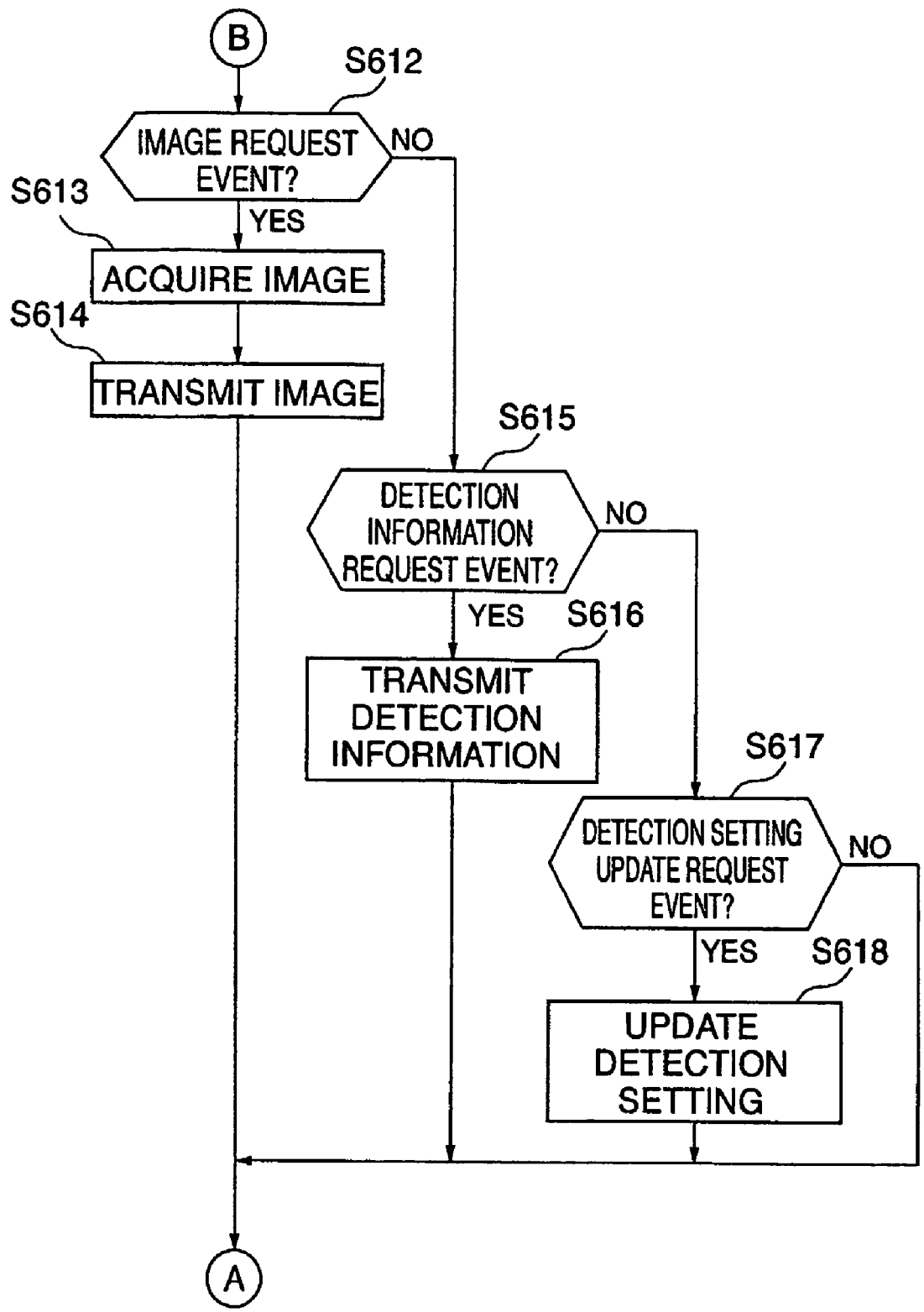
FIG. 7 is a continued part of the flow chart in FIG. 6.
Figure 8:
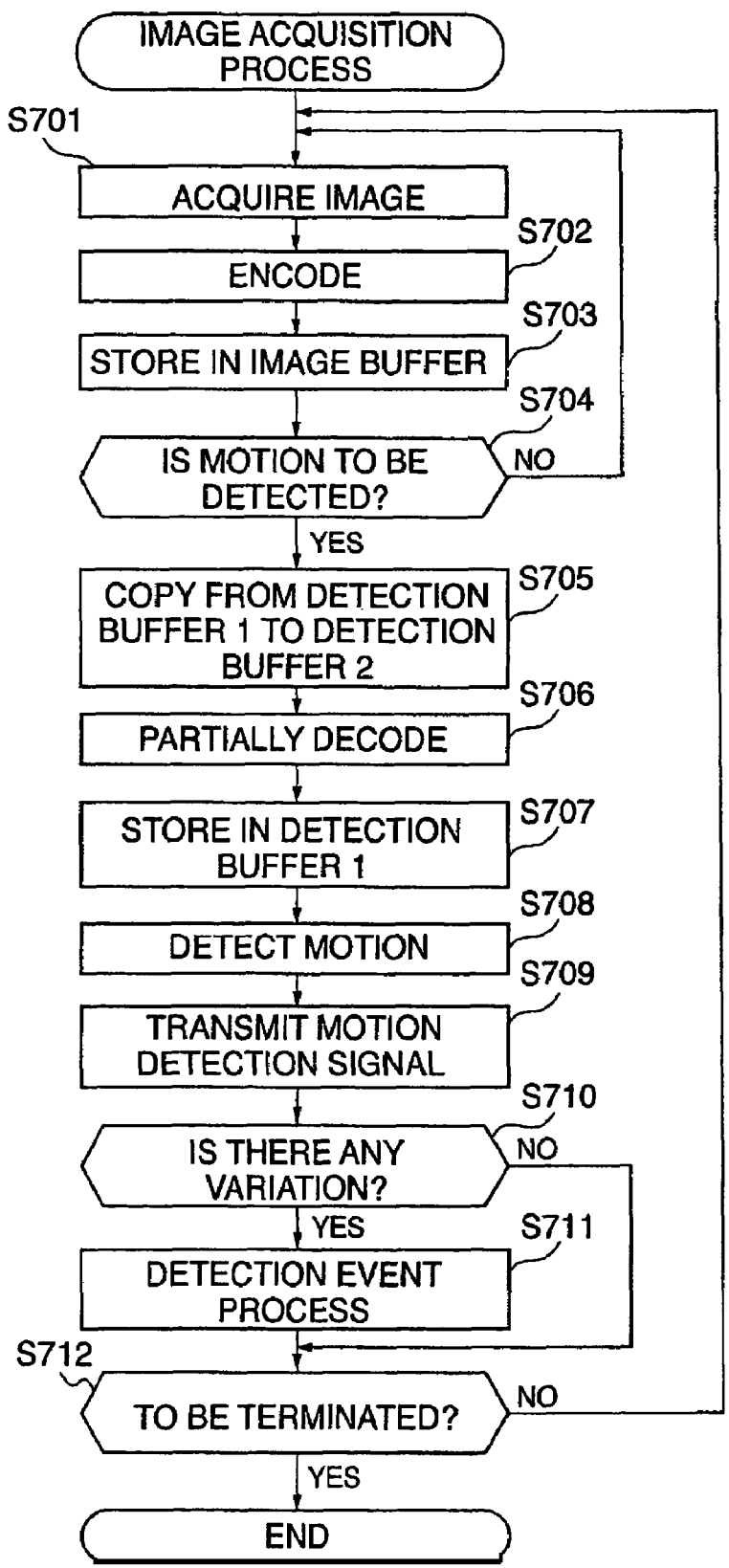
FIG. 8 is a flow chart showing an image acquisition process carried out by the camera server.

A description will now be given of the operation of the camera server 11 with reference to FIGS. 6 to 8. FIGS. 6 and 7 are flow charts showing a main process carried out by the camera server 11 in FIG. 1, and FIG. 8 is a flow chart showing an image acquisition process carried out by the camera server 11 in FIG. 1.

As shown in FIG. 6, in the main process carried out by the camera server 11, first, initialization is carried out in a step S601. In the next step S602, the image acquisition process is started. The image acquisition process will be described later in further detail with reference to FIG. 8. Then, in a step S603, the occurrence of an event is awaited.

When an event occurs in the step S603, it is determined in a step S604 whether the event is a connection request event or not. If the event is the connection request event, it is determined in a step S605 whether connection can be permitted or not. The reason why this determination is made is that there may be a case where connection may not be permitted if limitations are imposed on the number of connections or the connection service time. If connection cannot be permitted, a connection denial notification is given in a step S606, and the process returns to the step S603.

If it is determined in the step S605 that connection can be permitted, the client terminal which has issued a request for the connection is registered in a step S607. Here, a management number is assigned to the client, and the IP address thereof is registered, and management data such as connection time is initialized. Then, in a step S608, a connection permission notification is given to the client terminal which has issued the connection request. Here, the management number assigned to the client or the like is notified to the client at the same time. The process then returns to the step S603.

If it is determined in the step S604 that the event is not the connection request event, it is determined in a step S609 whether the event is a connection termination request event or not. If the event is the connection termination request event, the process proceeds to a step S610 wherein a connection termination notification is given to the client which has issued a request for the connection termination request, and in the next step S611, management data on the client which has issued the connection termination request is deleted. The process then returns to the step S603.

If it is determined in the step S609 that the event is not the connection termination request event, it is determined in a step S612 in FIG. 7 whether the event is an image request event or not. If the event is the image request event, an image is acquired from the camera 12 in a step S613, and in the next step S614, the image is transmitted to the client terminal which has requested the image. The process then returns to the step S603.

If it is determined in the step S612 that the event is not the image request event, it is determined in a step S615 whether the event is a detection information request event or not. If the event is the detection information request event, the process proceeds to a step S616 wherein a motion detection signal indicative of the result of the motion detection processing is transmitted to the client terminal which has requested detection information. The process then returns to the step S603.

If it is determined in the step S615 that the event is not the detection information request event, it is determined in a step S617 whether the event is a detection setting update request event or not. If the event is the detection setting update request event, the process proceeds to a step S618 wherein the set values of the motion detecting section 25 are updated according to a motion detection setting signal transmitted from the client which has issued a request for the detection setting update. The process then returns to the step S603. On the other hand, if the event is not the detection setting update request event, the process returns to the step S603.

In the image acquisition process started in the step S602, as shown in FIG. 8, an image is acquired from the camera 12 in a step 701, and then, in a step S702, the acquired image is encoded. Then, in a step S703, the encoded image is stored in an image buffer. If the image request event occurs in the main process (step S612), the image stored in the image buffer is transmitted.

Then, in a step S704, it is determined whether motion detection processing is to be carried out or not. This determination is made according to whether a check box for selecting whether motion detection processing is to be carried out or not has been checked off or not on a setting screen. If motion detection processing is not to be carried out, the process returns to the step S701. On the other hand, if it is determined that motion detection processing is to be carried out, the process proceeds to a step S705 wherein data in a detection buffer 1, not shown, provided for motion detection processing is copied to a detection buffer 2, not shown. Here, the detection buffers 1 and 2 store image data which has been partially decoded, i.e. partially encoded. Then, in a step S706, the image data stored in the detection buffer 2 is partially decoded to extract a JPEG DCT coefficient.

Then, in a step S707, the image data which has been partially decoded is stored in the detection buffer 1. As a result, data corresponding to an image of an immediately preceding frame is stored in the detection buffer 2, and data corresponding to an image of the present frame is stored in the detection buffer 1. Then, in a step S708, the motion detecting section 25 carries out motion detection processing in the above described manner. In the next step S709, if there is any client which has requested a detection information request, a motion detection signal indicative of the result of the motion detection processing is transmitted to the client. The result of the motion detection processing includes the position of a block or blocks where a motion has occurred, the area ratio, and so forth.

Then, in a step S710, it is determined whether a motion has been detected or not. If a motion has been detected, detection event processing is carried out in a step S711. The detection event processing is intended to notify the connected client that the detection of a variation in an image has been started or terminated. The process then proceeds to a step S712. On the other hand, if it is determined in the step S710 that a variation has not been detected, the process proceeds to the step S712 with the step S711 being skipped.

In the step S712, it is determined whether the present process is to be terminated or not. This determination is made according to whether any exceptional processing has occurred or not. If any exceptional processing has occurred, it is determined that the present process is to be terminated, and then the present process is terminated. If no exceptional processing has occurred, it is determined that the present process is not to be terminated, and the process returns to the step S701.

Figure 9:
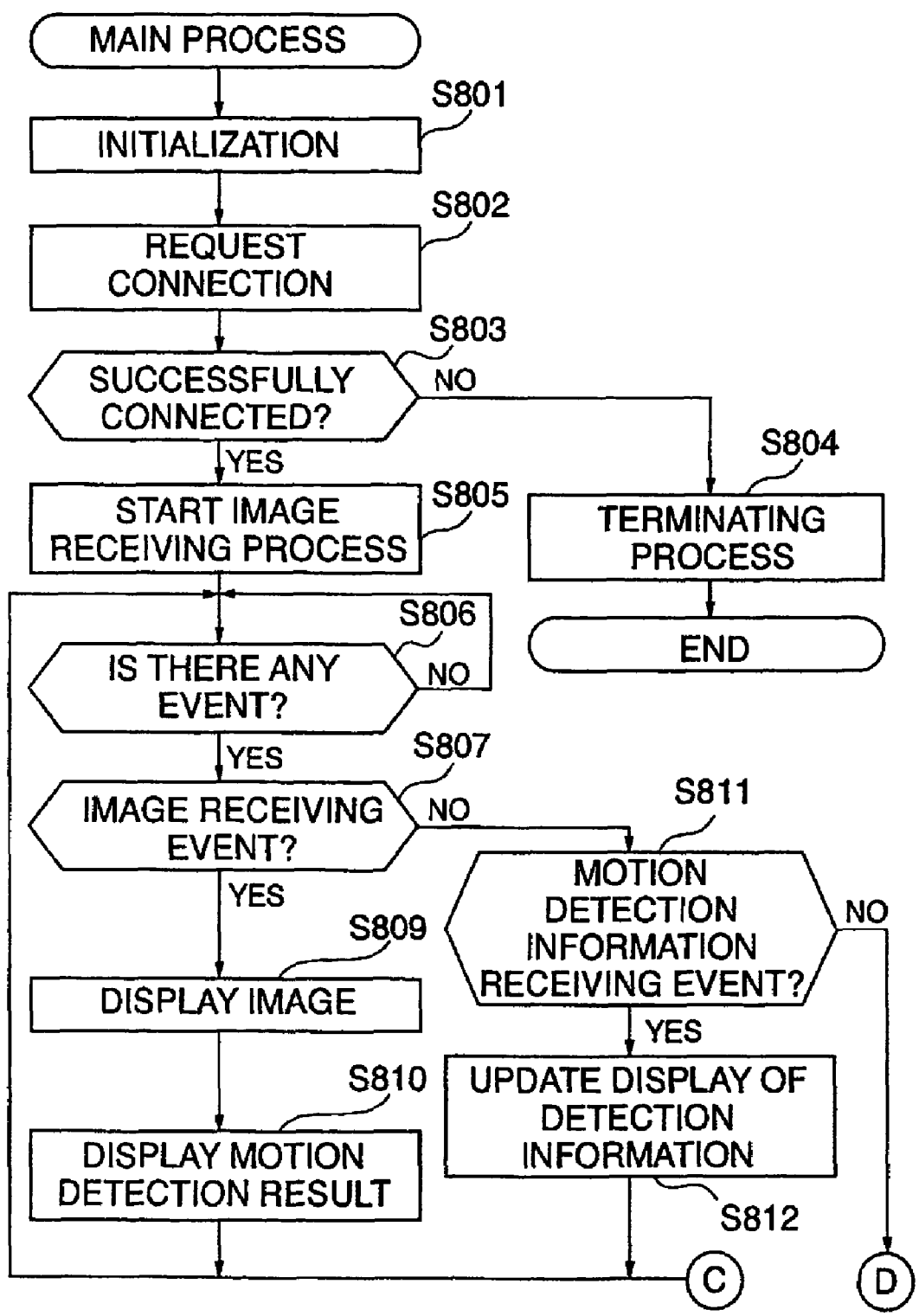
FIG. 9 is a flow chart showing a main process carried out by the setting terminal.
Figure 10:
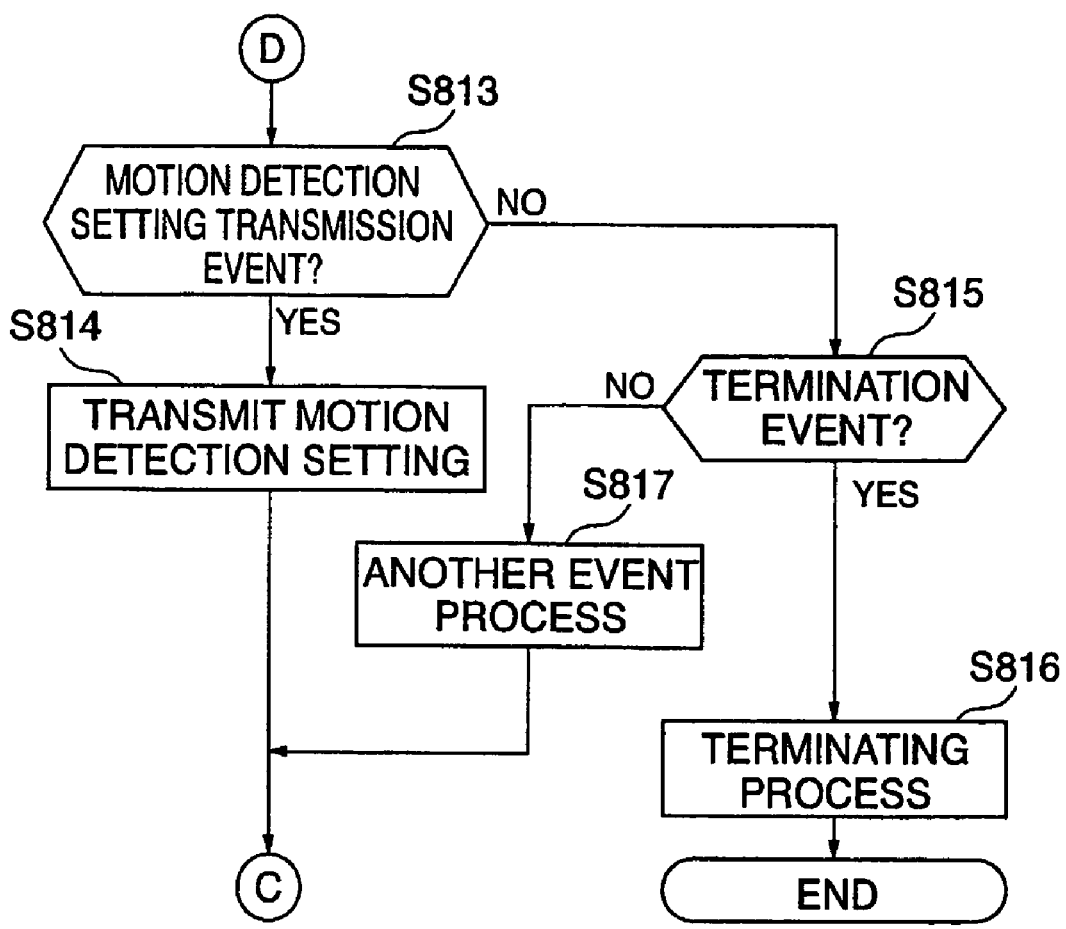
FIG. 10 is a continued part of the flow chart in FIG. 9.
Figure 11:
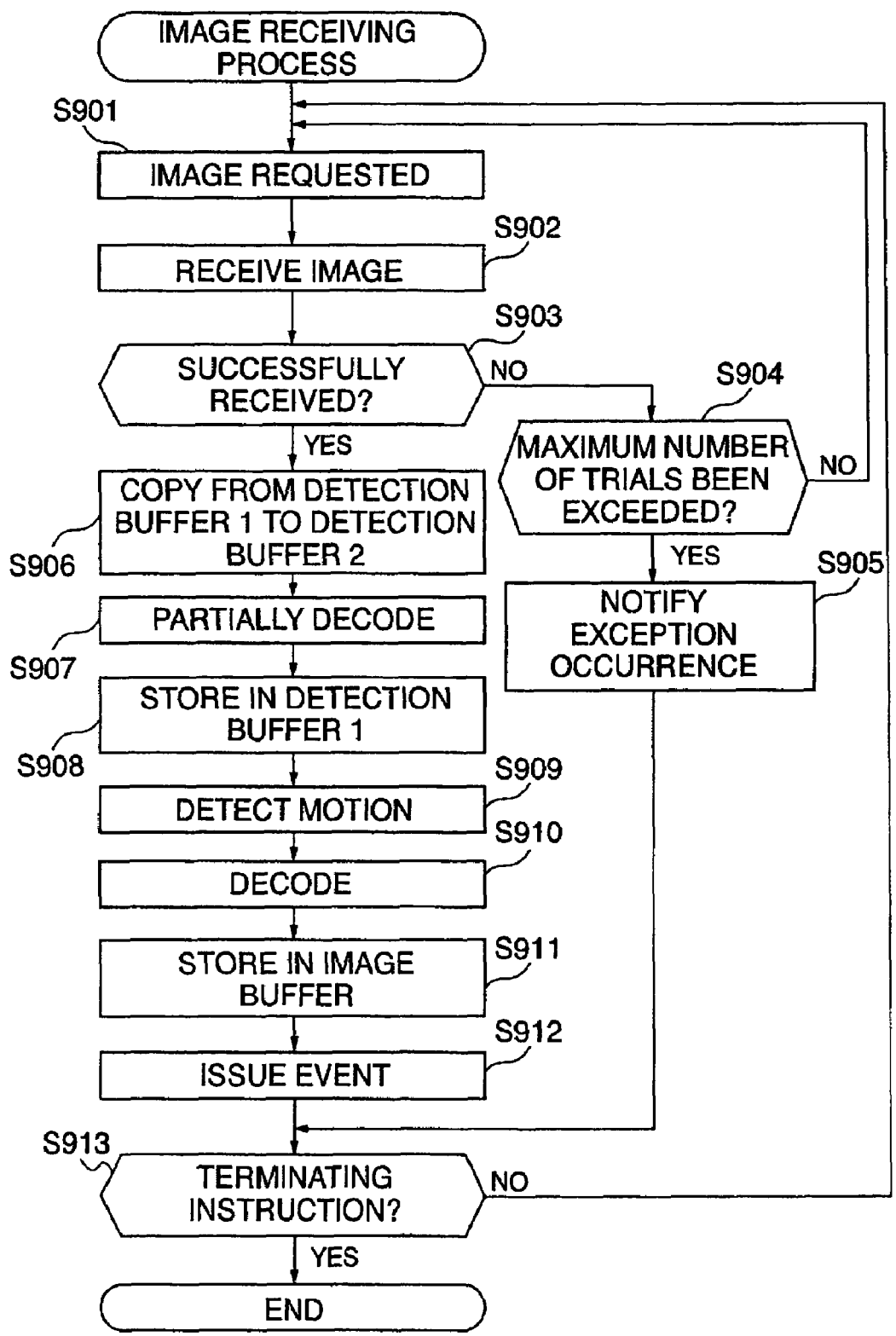
FIG. 11 is a flow chart showing an image receiving process carried out by the setting terminal.

A description will now be given of processes carried out by the setting terminal 15 with reference to FIGS. 9 to 11. FIGS. 9 and 10 are flow charts showing a main process carried out by the setting terminal 15, and FIG. 11 is a flow chart showing an image receiving process carried out by the setting terminal 15.

As shown in FIG. 9, in the main process carried out by the setting terminal 15, initialization is carried out first in a step S801. In the next step S802, a connection request is given to the camera server 11. Then, in a step S803, a response from the camera server 11 to the connection request is awaited. If connection has failed, termination processing is carried out in a step S804 to terminate the process. On the other hand, if connection has been successful, the image receiving process is started in a step S805. The image receiving process will be described later in further detail with reference to FIG. 11.

Then, in a step S806, the occurrence of an event is awaited. When an event occurs, it is determined in a step S807 whether the event is an image receiving event or not. If the event is the image receiving event, an image is displayed in a step S809, and then the result of the motion detection processing is displayed in a step S810. The display of blocks on an image, and the display of the area ratio in graph form are displayed as the result of the motion detection. It should be noted that to display the result of the motion detection processing, the setting terminal 15 needs to be selected using the detection result switching radio button 55 on the setting operating screen 51. Here, if the camera server 11 is selected, the displayed motion detection status is updated in a motion detection information receiving event, described later. The process then returns to the step S806.

If it is determined in the step S807 that the event is not the image receiving event, it is determined in a step S811 whether the event is a motion detection information receiving event or not. If the event is the motion detection information receiving event, the displayed detection information is updated in a step S812. In this case, contrary to the step S810, the camera server 11 needs to be selected using the radio button 55. The process then returns to the step S806.

If it is determined in the step S811 that the event is not the motion detection information receiving event, it is determined in a step S813 in FIG. 10 whether the event is a motion detection setting transmission event or not. If the event is the motion detection setting transmission event, set values for use in detection of a motion are transmitted in a step S814, and the process then returns to the step S806.

If it is determined in the step S813 that the event is not the motion detection setting transmission event, it is determined in a step S815 whether the event is a termination event or not. The termination event occurs when the termination button 60 (FIG. 5A) is depressed or when a currently displayed window is forced to be closed. If the event is the termination event, termination processing is carried out in a step S816. On the other hand, if the event is not the termination event, another event processing is carried out in a step S817. The process then returns to the step S806.

In the image receiving process started in the step S805, as shown in FIG. 11, an image request is issued in a step S901, and then in a step S902, the reception of an image is tried. Then, in a step S903, it is determined whether the reception of the image in the step S902 has been successful or not. Here, if the reception of the image has failed due to an abnormality in the network 14 or the like, it is determined in a step S904 whether the number of trials has exceeded the maximum number of trials or not. If the number of trials has not exceeded the maximum number of trials, the process returns to the step S901. On the other hand, if the number of trials has exceeded the maximum number of trials, a notification of the occurrence of an exception is given for the main process in a step S905, and the process then proceeds to a step S913, described later.

If it is determined in the step S903 that the reception of the image in the step S902 been successful, the process proceeds to a step S906 wherein image data stored in the detection buffer 1 provided in advance is copied to the detection buffer 2, and then proceeds to a step S907 wherein the image data stored in the detection buffer 2 is partially decoded to extract a JPEG DCT coefficient. Then, in a step S908, the image data which has been partially decoded is stored in the detection buffer 1.

Then, in a step S909, motion detection processing is carried out using the detection buffers 1 and 2, and in a step S910, the original encoded image is decoded. Then, in a step S911, the decoded image is stored in an image buffer provided in advance.

Then, in a step S912, an image receiving event is issued for the main process, and a notification of image acquisition and a notification of the termination of motion detection processing are given. It is then determined in a step S913 whether or not a termination instruction has been issued from the main process or the like. Here, if the termination instruction has been issued, the present process is terminated. If the termination process has not been issued, the process returns to the step S901.

As described above, according to the present embodiment, proper set values for the motion detection processing carried out by the camera server 11 can be set through the operation of the setting terminal 15. Further, the result of the motion detection processing carried out by the setting terminal 15 or the result of the motion detection processing carried out by the camera server 11 can be selectively displayed to enable confirmation of the result of the motion detection processing carried out by the setting terminal 15 or the camera server 11.

Figure 12:
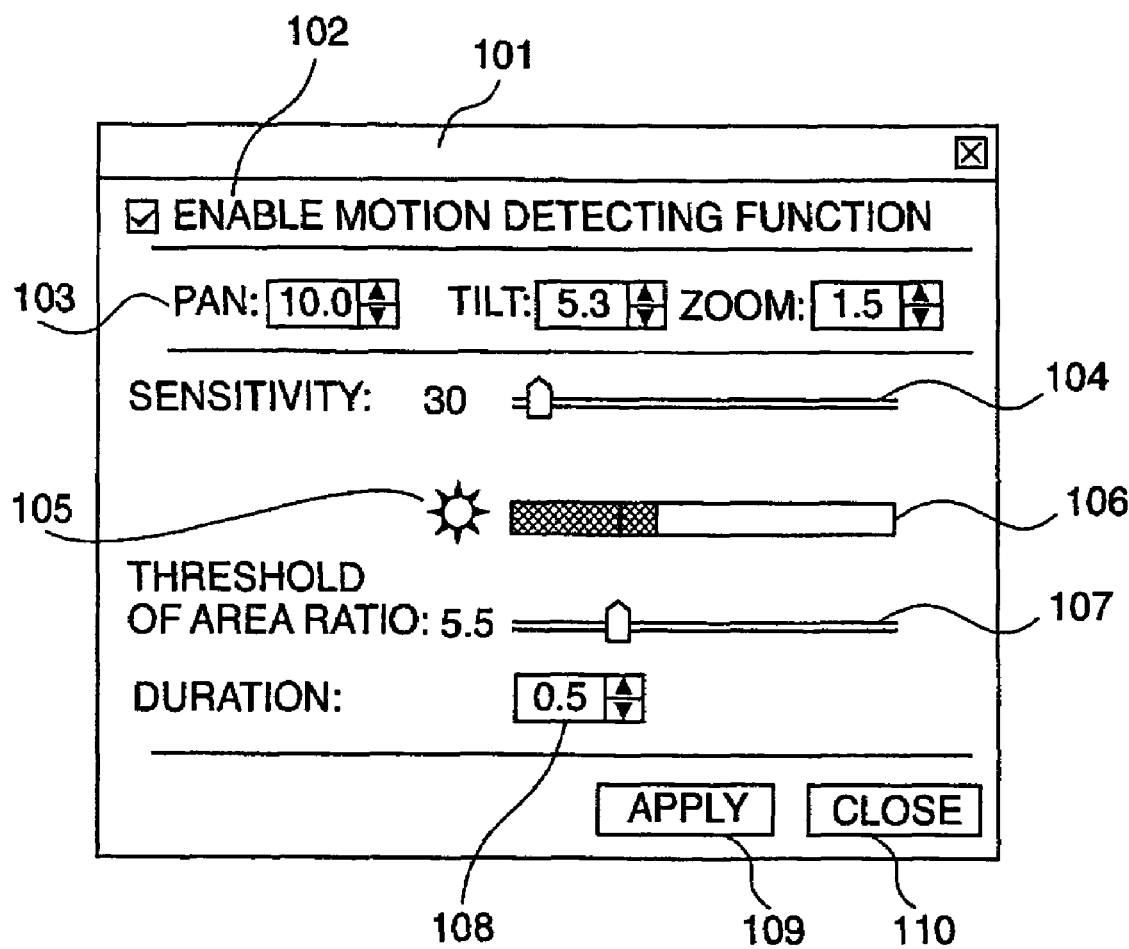
FIG. 12 is a view showing an example of a setting operating screen for making various settings for motion detection processing carried out by a setting terminal of a motion detection system according to a second embodiment of the present invention.

Next, a description will be given of a second embodiment of the present invention with reference to FIG. 12. FIG. 12 is a view showing an example of a setting operating screen for making various settings in motion detection processing carried out by a setting terminal of a motion detection parameter setting system according to the second embodiment.

A description will only be given of differences between the first embodiment and the second embodiment, and description of elements and parts corresponding to those of the first embodiment is omitted. Further, in the following description, elements and parts corresponding to those of the first embodiment are denoted by the same reference numerals.

In the present embodiment, the setting terminal 15 is configured such that the result of the motion detection processing carried out by the setting terminal 15 and the result of the motion detection processing carried out by the camera server 11 can be displayed at the same time. Therefore, a difference in the result of the motion detection processing between the setting terminal 15 and the camera server 11 can be seen at a first glance.

Specifically, as shown in FIG. 12, on a setting operating screen 101 for making various settings in motion detection processing carried out by the setting terminal 15 includes a check box 102 for selecting whether to enable or disable the motion detecting function, an edition box 103 with UP/DOWN arrows for designating values of pan, tilt, and zoom in the case where a camera which can be controlled is subjected to the processing, a slide bar 104 for adjusting the sensitivity, a slide bar 107 for adjusting the threshold of area ratio, a display bar 106 for displaying in the form of a real time horizontal graph the present area ratio i.e. the ratio of a region where a motion has been detected to the motion detecting object region, an edition box 108 with UP/DOWN arrows for displaying/setting the duration, and a motion detection event display section 105 for the camera server 11.

The motion detection event display section 105 flashes when a motion detection starting/termination event is received from the camera server 11. Further, it goes without saying that it is meaningless to display information indicative of the result of the motion detection processing carried out by the camera server 11 before respective thresholds of sensitivity, area ratio, and duration are transmitted, and hence the set values have to be fixed using an application button 109.

The procedure of processing carried out by the camera server 11 according to the present embodiment is the same as in the first embodiment. Further, in the processes carried out by the setting terminal 15, the result of the motion detection processing is displayed in the steps S810 and S812 in FIG. 9. Namely, in the step S810, the area ratio as the result of the motion detection processing carried out by the setting terminal 15 is displayed on real time, and in the step S812, the motion detection event display section 105 displays a motion detection starting/termination event received from the camera server 11.

As described above, according to the present embodiment, the result of the motion detection processing carried out by the camera server 11 and the result of the motion detection processing carried out by the setting terminal 15 can be displayed at the same time in the motion detection event display section 105 and the display bar 106, respectively.

Figure 13A:
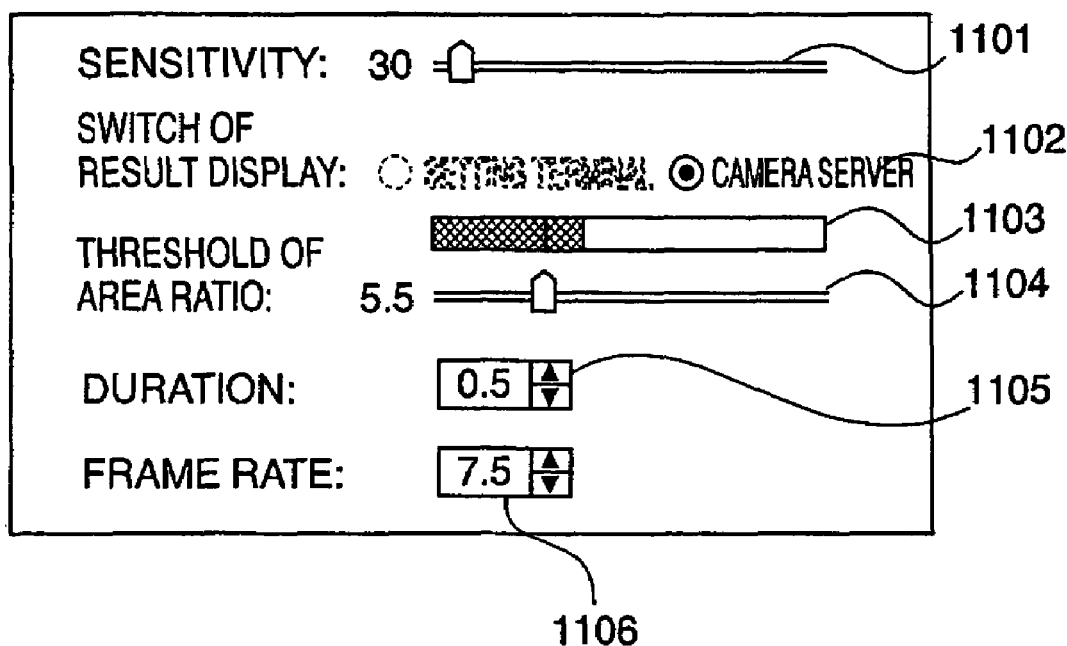
FIG. 13A is a view showing an example of a setting operating screen for making various settings for motion detection processing carried out by a setting terminal of a motion detection system according to a third embodiment of the present invention.
Figure 13B:
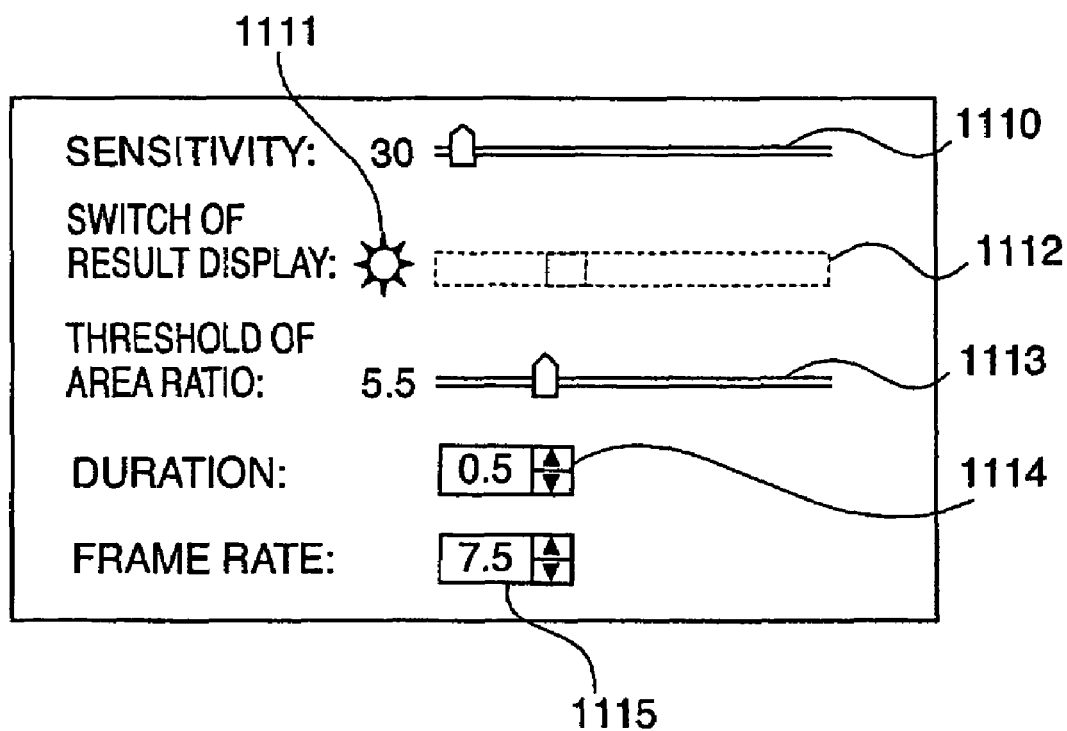
FIG. 13B is a view showing another example of the setting operating screen.

A description will now be given of a third embodiment of the present invention with reference to FIGS. 13A and 13B. FIG. 13A is a view showing an example of a setting operating screen for making various settings in motion detection processing carried out by a setting terminal of a motion detection parameter setting system according to the third embodiment, and FIG. 13B is a view showing another example of the setting operating screen.

A description will only be given of differences between the above described first and second embodiments and the third embodiment, and description of elements and parts corresponding to those of the first embodiment is omitted. Further, in the following description, elements and parts corresponding to those of the first embodiment are denoted by the same reference numerals.

If a frame rate obtained by the camera server 11 and a frame rate received by the setting terminal 15 are different from each other, there may be a difference in the result of the motion detection processing between the camera server 11 and the setting terminal 15 due to a difference in the interval between adjacent frames subjected to motion detection processing. Therefore, in the present embodiment, if there is a great difference in the frame rate of motion detection processing between the camera server 11 and the setting terminal 15 in the first or second embodiment, the display of the result of the motion detection processing carried out by the setting terminal 15 is nullified. This assures a high accuracy in displaying/comparing the results of motion detection processing carried out by the camera server 11 and the setting terminal 15.

Further, to determine whether or not the frame rate of motion detection processing carried out by the setting terminal 15 and the frame rate of motion detection processing carried out by the camera server 11 are different from each other, the setting terminal 15 is provided with a GUI (Graphical User Interface) for setting the frame rate so that motion detection processing can be carried out by the camera server 11 and the setting terminal 15 at the set frame rate.

The upper limit of the frame rate is determined in dependence on the processing capacity of the camera server 11, and hence if the frame rate is set to be equal to or lower than the upper limit of the frame rate of the camera server 11, the camera server 11 can always be operated at the set frame rate. On the other hand, the frame rate of motion detection processing carried out by the setting terminal 15 is likely to be lower than the frame rate of the camera server 11 for the reason that, for example, the network 14 has a low transmission speed. Therefore, if the setting terminal 15 compares a designated processing rate value and the actual processing rate with each other, it is possible to easily recognize a difference in the frame rate of motion detection processing between the camera server 11 and the setting terminal 15. Here, if the difference is equal to or greater than a reference value, the display of the setting terminal 15 is nullified.

As shown in FIG. 13A, the setting operating screen for making various settings in motion detection processing carried out by the setting terminal 15 includes a slide bar 1101 for adjusting the sensitivity, a slide bar 1104 for adjusting the threshold of area ratio, an edition box 1105 with UP/DOWN arrows for displaying/setting the duration, an edition box 1106 with UP/DOWN arrows for setting the frame rate, a display bar 1103 for displaying in the form of a real time horizontal graph the present area ratio i.e. the ratio of a region where a motion has been detected to the motion detecting object region, and a radio button 1102 for selectively specifying whether the result of motion detection processing carried out by the setting terminal 15 is to be displayed or the result of motion detection processing carried out by the camera server 11 is to be displayed in actual-time display of the motion detection area ratio indicated by the display bar 1103.

In the example in FIG. 13A, the setting terminal 15 and the camera server 11 are different in frame rate, and the radio button 1102 has been forced to be switched to the camera server 11 to nullify the display of the result of the motion detection processing carried out by the setting terminal 15 ("setting tool" indicated by a dotted line in FIG. 13A).

Further, it is possible to use an operating setting screen shown in FIG. 13B. This screen is an improvement over the operating setting screen 101 according to the above described second embodiment. The setting operating screen in FIG. 13B includes a slide bar 1110 for adjusting the sensitivity, a slide bar 1113 for adjusting the threshold of area ratio, a display bar 1112 for displaying in the form of a real time horizontal graph the present area ratio i.e. the ratio of a region where a motion has been detected to the motion detecting object region, an edition box 1114 with UP/DOWN arrows for displaying/setting the duration, an edition box 1115 with UP/DOWN arrows for setting the frame rate, and a motion detection event display section 1111 for the camera server 11.

In the example in FIG. 13B, the setting terminal 15 and the camera server 11 are significantly different in frame rate, and the display bar 1112 is displayed in gray (as indicated by a dotted line in FIG. 13B), i.e. nullified.

The procedure of processing carried out by the camera server 11 according to the present embodiment is the same as in the first embodiment. Further, in the processes carried out by the setting terminal 15, in the step S810 in FIG. 9 as described above, the frame rate of the setting terminal 15 and the frame rate of the camera server 11 are compared with each other, and if there is a great difference, the radio button 1102 is forced to be switched to the camera server 11 to nullify the display of the result of the motion detection processing carried out by the setting terminal 15 ("setting tool" in FIG. 13A) (in the case of the setting operating screen in FIG. 13A), or the display bar 1112 is nullified (in the case of the setting operating screen in FIG. 13B).

As described above, according to the present embodiment, if there is a great difference in the frame rate between the camera server 11 and the setting terminal 15, the display of the result of the motion detection processing carried out by the setting terminal 15 can be nullified. This assures a high accuracy in displaying/comparing the results of motion detection processing carried out by the camera server 11 and the setting terminal 15.

Figure 14:
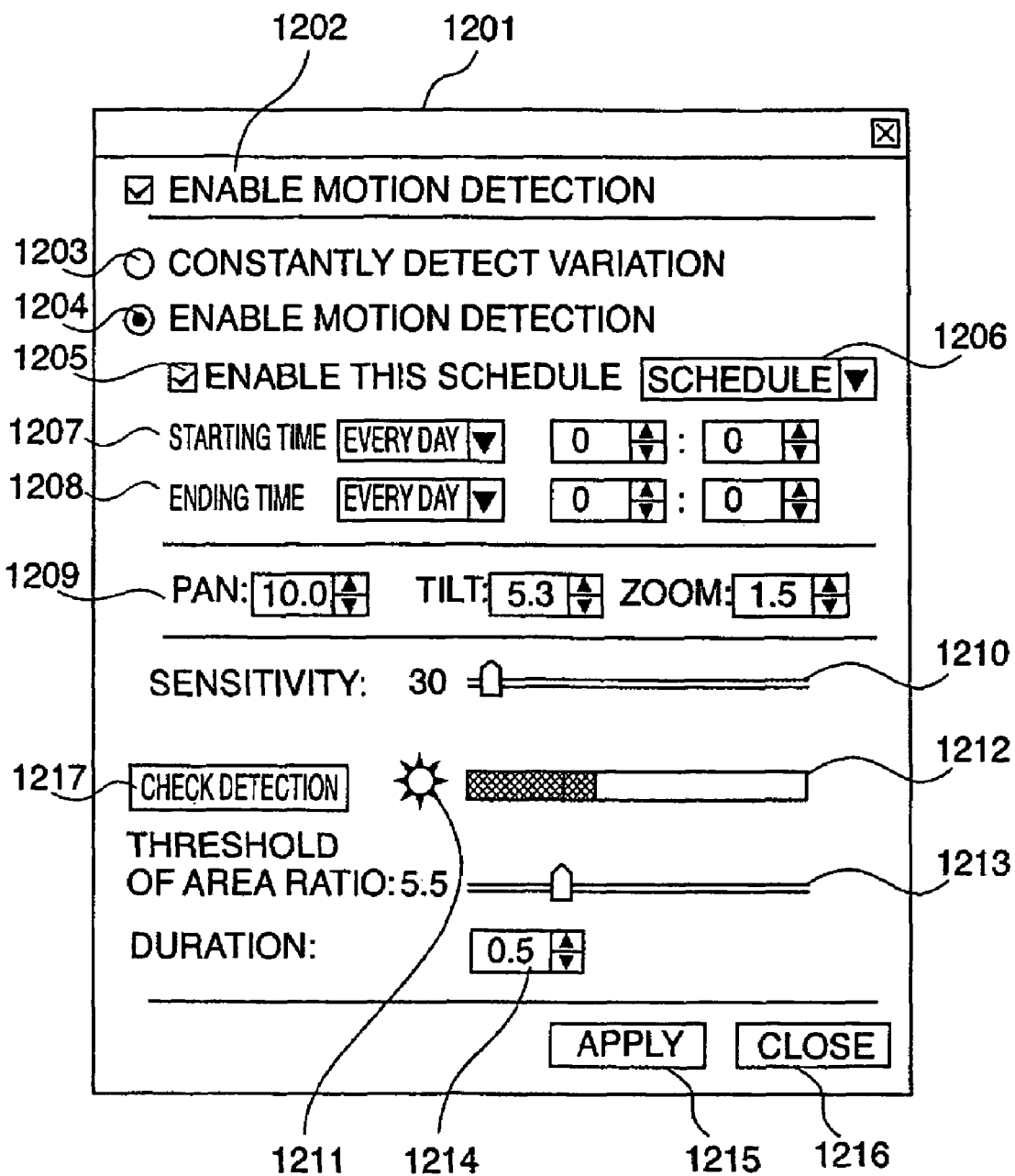
FIG. 14 is a view showing an example of a setting operating screen for making various settings for motion detection processing carried out by a setting terminal of a motion detection system according to a fourth embodiment of the present invention.
Figure 15:
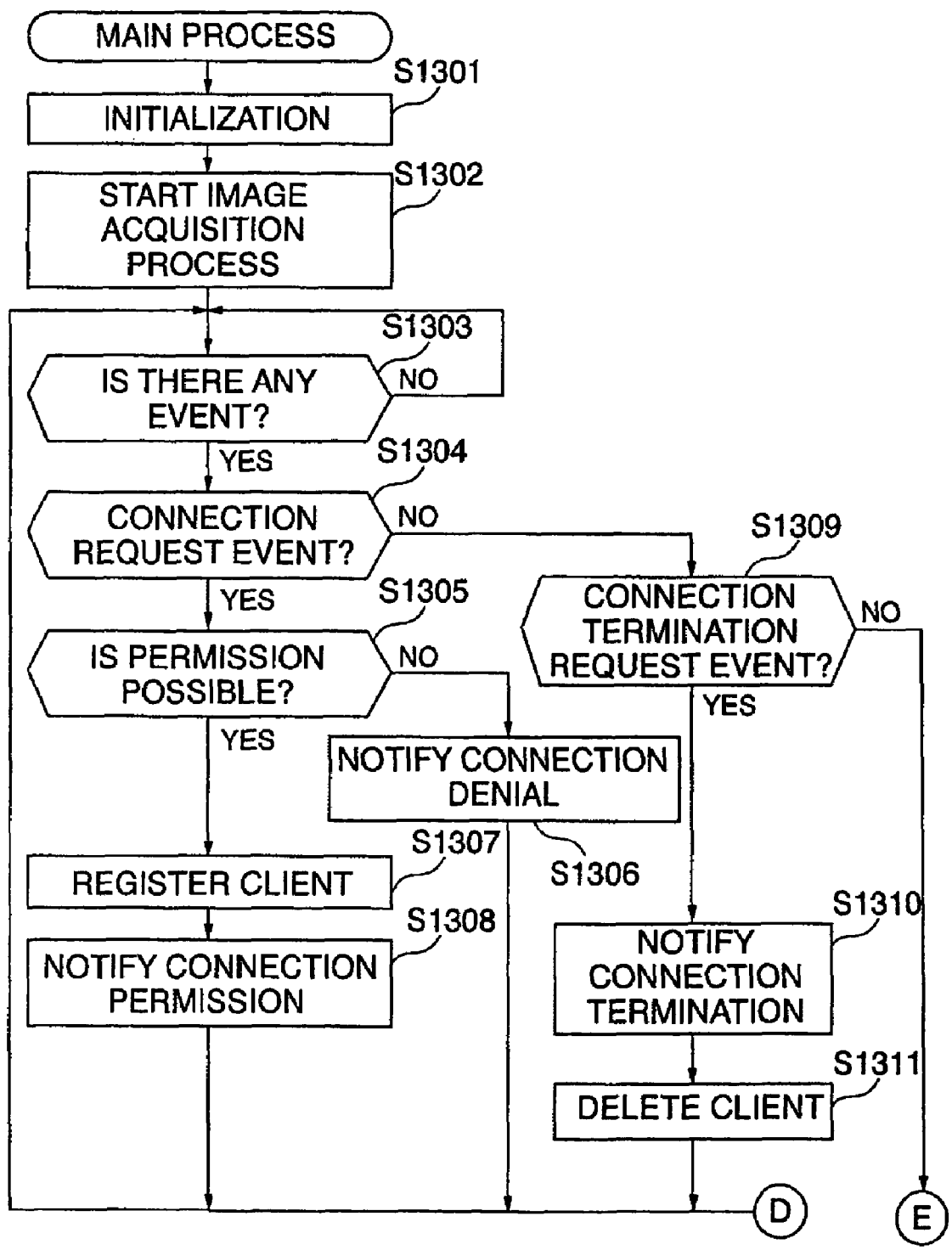
FIG. 15 is a flow chart showing a main process carried out by the camera server of the motion detection system according to the fourth embodiment.
Figure 16:
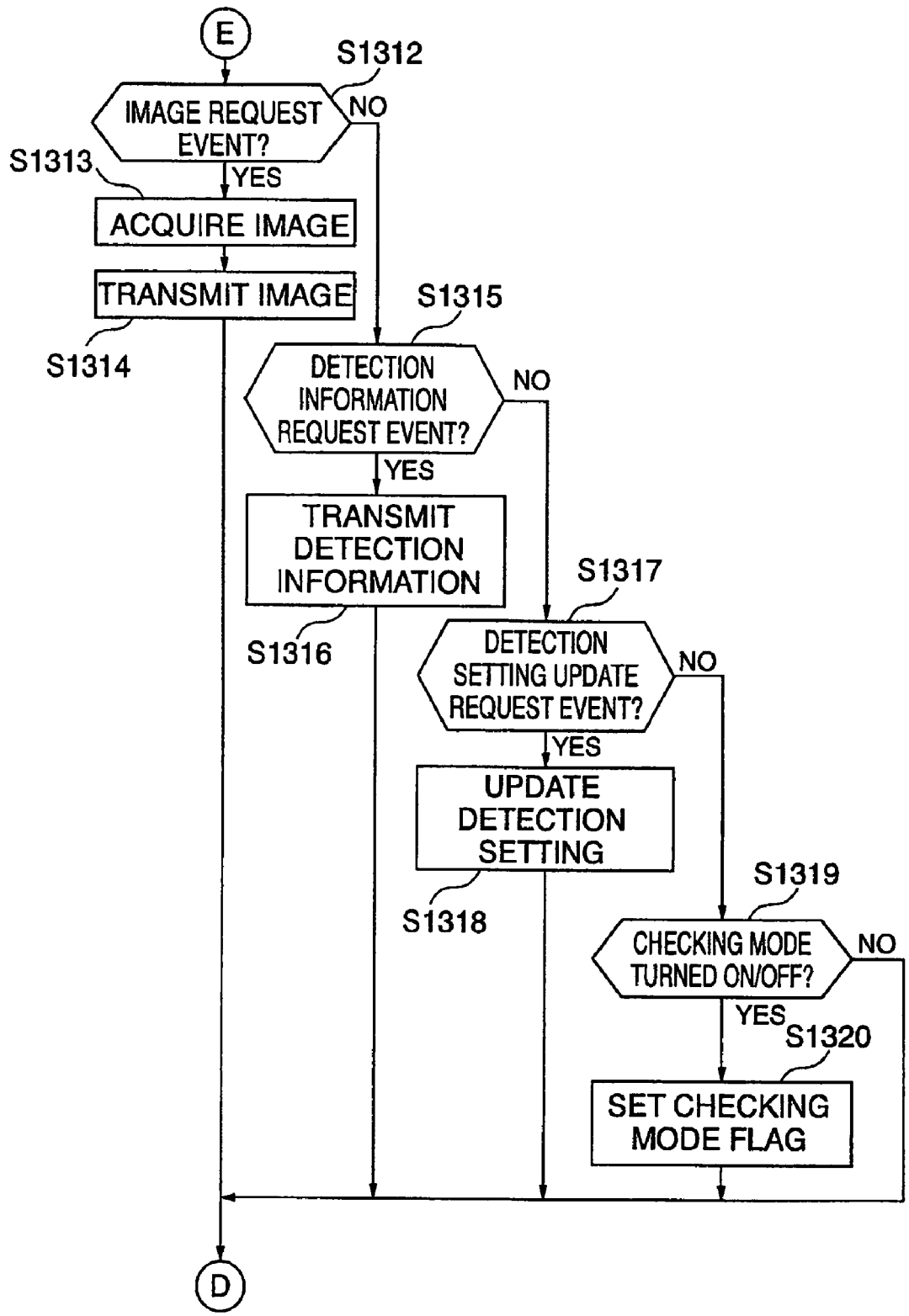
FIG. 16 is a continued part of the flow chart in FIG. 15.

A description will now be given of a fourth embodiment of the present invention with reference to FIGS. 14 to 16. FIG. 14 is a view showing an example of a setting operating screen for making various settings in motion detection processing carried out by a setting terminal of a motion detection parameter setting system according to the fourth embodiment, and FIGS. 15 and 16 are flow charts showing a main process carried out by a camera server of the motion detection parameter setting system according to the fourth embodiment.

A description will only be given of differences between the above described first embodiment and the fourth embodiment, and description of elements and parts corresponding to those of the first embodiment is omitted. Further, in the following description, elements and parts corresponding to those of the first embodiment are denoted by the same reference numerals.

While the system according to the above described first to third embodiments constantly carries out motion detection processing, the system according to the present embodiment carries out motion detection processing in accordance with a specified schedule. Further, the system according to the present embodiment has a function of temporarily ignoring a specified schedule to enable the motion detecting function of the camera server 11 so as to check the effect of motion detection settings even outside the specified schedule.

In the present embodiment, a screen 1201 in FIG. 14 is displayed as a setting operating screen for making various settings in motion detection processing carried out by the setting terminal 15. The screen 1201 includes a check box 1202 for specifying whether the motion detecting function is to be enabled or disabled, radio buttons 1203 and 1204 for specifying whether motion detection processing is to be carried out constantly or in accordance with a schedule, a list box 1206 for selecting a schedule in the case of individual scheduling, a check box 1205 for selecting whether the schedule selected in the list box 1206 is to be used or not, a schedule starting time setting section 1207, and a schedule ending time setting section 1208.

Further, the screen 1201 includes an edition box 1209 with UP/DOWN arrows for selecting values of pan, tilt, and zoom in the case where a camera which can be controlled is subjected to the processing, a slide bar 1210 for adjusting the sensitivity, a slide bar 1213 for adjusting the threshold of area ratio, a display bar 1212 for displaying in the form of a real time horizontal graph the present area ratio i.e. the ratio of a region where a motion has been detected to the motion detecting object region, an edition box 1214 with UP/DOWN arrows for displaying/setting the duration, a motion detection event display section 1211 for the camera server 11, and a button 1217 for configuring the camera server 11 to be forced to carry out motion detection processing. The button 1217 is a toggle button, which is selectively brought into a pressed-in state or a normal state.

Further, an application button 1215 for fixing set values, and a button 1216 for closing a window are displayed at the bottom of the window.

In the present embodiment, although it is possible to designate whether motion detection processing is to be carried out every day or on a specified day of the week, and to designate a point in time, but the present invention is not limited to this, another scheduling method may be adopted.

In the above described GUI (Graphical User Interface), the user enables the motion detecting function using the check box 1202, and then uses the radio button 1203 or 1204 to determine whether motion detection processing is to be carried out constantly or in accordance with a specified schedule. If the user determines to carry out motion detection processing in accordance with a specified schedule, he/she selects a schedule in the list box 1206 and enables the schedule, and sets a starting time and an ending time using the time setting sections 1207 and 1208. As a result, the respective set values of pan/tilt/zoom, and region, and thresholds of sensitivity, area ratio, and duration are set on a one-to-one basis with respect to the schedule. If another schedule is selected, the display is also changed accordingly.

When the button 1217 is depressed, the motion detection event display section 1211 for the camera server 11 is enabled, so that the result of the motion detection processing carried out by the camera server 11 can be checked as in the second embodiment. On this occasion, the sections 1203 to 1208 for setting a schedule are e.g. disabled to notify the user that motion detection processing can be forced to be carried out with the schedule being ignored. Then, depressed again, the button 1217 is brought into the normal state to enable motion detection processing to be carried out in accordance with the schedule.

A description will now be given of the operation of the camera server 11 according to the present embodiment with reference to FIGS. 15 and 16. Here, differences from FIGS. 6 and 7 will only be described.

The camera server 11 has a detection checking mode flag for holding a status indicative of whether a detection checking mode in which the schedule is temporarily ignored is set or not. The flag is turned on/off in accordance with a request from the setting terminal 15. Steps 1319 and 1320 are added as shown in FIG. 16 to carry out processing for a detection checking mode turning-on/off event. The detection checking mode turning-on event occurs when the button 1217 is brought into the pressed-in state, while the detection checking mode turning-off event occurs when the button 1217 is brought into the normal state.

In the image acquisition process carried out by the camera server 11 (step S1302 in FIG. 15, and FIG. 8), conditions for carry out motion detection processing are changed as described below.

Specifically, motion detection processing is carried out under the conditions that 1) a motion detection processing execution flag is on, and 2) the detection checking mode flag is on, or if the detection checking mode flag is off, the present time is within a specified schedule.

Therefore, the camera server 11 can be additionally provided with a function of being forced to carry out motion detection processing irrespective of a specified schedule.

In the setting terminal 15, processing performed in accordance with the state of the button 1217 is added to another event processing in the step S817 in FIG. 10. Specifically, when the button 1217 in the normal state is depressed, it is brought into the pressed-in state, so that a simulation starting request is transmitted to the camera server 11. Then, the motion detection event display section 1211 is updated according to a motion detection event from the camera server 11. On the other hand, if the pressed-in button 1217 is depressed, it is returned to the normal state, so that a simulation ending event is transmitted to the camera server 11.

As described above, according to the present embodiment, the camera server 11 is provided with the function of being forced to carry out motion detection processing while ignoring a set schedule, and by giving an instruction for starting/ending the function from the setting terminal 15, the validity of settings as to motion detection processing can be checked without being affected by a set schedule.

Although in the present embodiment, the button 1217 is provided, the present invention is not limited to this, but the button 1217 may be omitted, so that when motion detection processing is not carried out by the camera server 11 in accordance with a schedule, the motion detection event display section 1211 can be disabled. To determine whether the present time is within a specified schedule or not, a notification of starting/ending of motion detection processing in accordance with a schedule is given from the camera server 11 to the setting terminal 15. This makes it possible to maintain the consistency between the schedule and the display of the setting terminal 15.

A description will now be given of a fifth embodiment of the present invention with reference to FIGS. 17 and 18.

Figure 17:
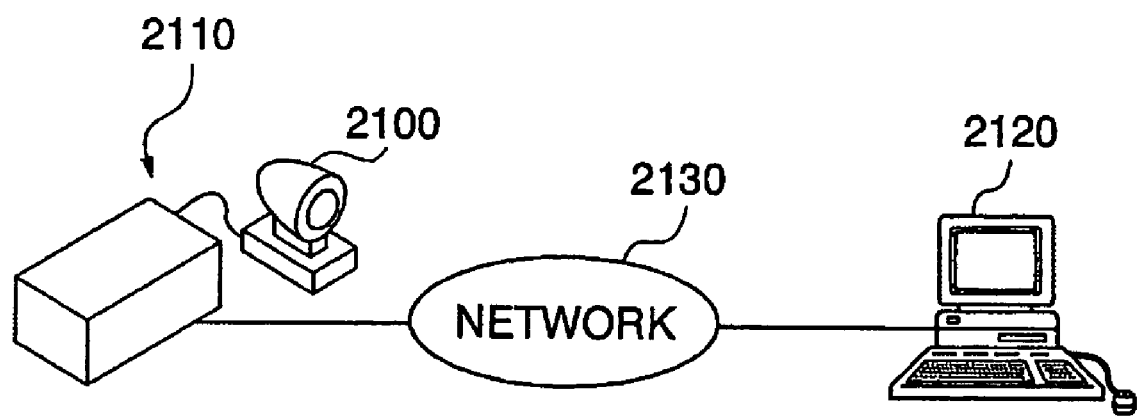
FIG. 17 is a block diagram showing the arrangement of a motion detection system including a camera setting device according to a fifth embodiment of the present invention.

FIG. 17 is a block diagram showing the arrangement of a motion detecting system including a camera setting apparatus according to the fifth embodiment.

As shown in FIG. 17, the system according to the present embodiment is comprised of a camera server 2110 to which an image pickup apparatus 2100 is connected, and a setting terminal 2120 which is connected to the camera server 2110 via a network 2130 for communication therebetween. The camera server 2110 captures an image taken by the image pickup apparatus 2100, and carries out motion detection processing according to the captured image. The motion detection processing is carried out using various parameters. The setting terminal 2120 has a function of setting various parameters for motion detection processing to the camera server 2110 via the network 2130.

A description will now be given of the constructions of the camera server 2110 and the setting terminal 2120 with reference to FIG. 18. FIG. 18 is a block diagram showing the respective constructions of the camera server 2110 and the setting terminal 2120 in FIG. 17.

The camera server 2110 is comprised of an image pickup section 2111 (corresponding to the image pickup apparatus 2100 in FIG. 17) which outputs an image as a digital image signal through an image pickup device such as a CCD; an image compressing section 2112 which compresses the image signal output from the image pickup section 2111 into Motion JPEG format, for example, so that the image signal can be transmitted to the network 2130; a motion detecting section 2113 which carries out the motion detection processing for detecting whether a motion of an object in an image taken by the image pickup apparatus 2100 has occurred or not according to the image signal output from the image pickup section 2111, and generates motion detection information according to the result of the motion detection processing; an image recording section 2114 which records and stores the image signal when a motion occurs; a detecting parameter holding section 2115 which holds various parameters such as the sensitivity at which motion detection processing is carried out by the motion detecting section 2113; and a communication control section 2116 which distributes the compressed image signal and the motion detection information via the network 2130, and enables setting of parameters for the motion detection processing via the network 2130. In the present embodiment, a motion detecting process is adopted as the motion detection processing carried out by the motion detecting section 2113.

The setting terminal 2120 includes a communication control section 2127 for controlling communication with the camera server 2110 via the network 2130. The communication control section 2127 receives a compressed image signal distributed from the camera server 2110, and the received compressed image signal is input to an image expanding section 2125. The image expanding section 2125 stores the input compressed image signal in an image temporary storage section 2124, and expands the compressed image signal. The image signal expanded by the image expanding section 2125 is input to a motion detection data processing section 2126 and an image display section 2121. The motion detection data processing section 2126 carries out processing for taking out the motion detection information attached to the image signal. The motion detection information taken out is then input to the image display section 2121. The image display section 2121 displays an image represented by the image signal input from the image expanding section 2125. Further, in the case where the motion detection information is input from the motion detection data processing section 2126, the motion detection information is superimposed on the image and displayed.

Further, the compressed image signal stored in the image temporary storage section 2124 is read out as the need arises, and is then expanded by the image expanding section 2125 and input to the image displays section 2121. At the same time, the compressed image signal stored in the image temporary storage section 2124 is input to a motion detecting section 2122. The motion detecting section 2122 carries out a motion detection processing for detecting whether a motion has occurred or not according to the input compressed image signal; and generates the motion detection information according to the result of the motion detection processing. The motion detecting section 2122 operates according to the same algorithm as the algorithm according to which the motion detecting section 2113 of the camera server 2110 operates. The motion detection information is input to the image displays section 2121. The image display section 2121 displays an image represented by the image signal input from the image expanding section 2125 (the image signal obtained by expanding the compressed image signal stored in the image temporary storage section 2124). Further, in the case where the motion detection information is input from the motion detecting section 2122, the motion detection information is superimposed on the image and displayed.

Various parameters such as the sensitivity, which are used for the motion detection processing carried out by the motion detecting section 2122 are stored in a detecting parameter holding section 2128. Various parameters for the motion detecting section 2122 and various parameters for the camera server 2110 can be set using a detecting parameter setting operating section 2123. To set various parameters using the detecting parameter setting operating section 2123, the motion detection processing is carried out according to an image signal stored in the image temporary storage section 2124 or an image signal from the camera server 2110, and with reference to the result, parameters for the motion detection processing are set. When various parameters are set using the detecting parameter setting operating section 2123, the set various parameters are held in the detecting parameter holding section 2128. The set various parameters are also transmitted to the camera server 2110 via the network 2130 under the control of the communication control section 2127. In the camera server 2110, the communication control section 2116 receives the various parameters from the setting terminal 2120, and the received various parameters are stored in the detecting parameter holding section 2115.

Although in the present embodiment, an image signal is compressed in Motion JPEG format, the present invention is not limited to this, but an image signal may be compressed in MPEG 4 format or H263 format with a higher compression ratio and using frame correlation, and may be compressed in various other formats.

Further, in the present embodiment, the motion of a subject is detected according to a difference between frames as is the case with the first through fourth embodiments so as to detect a motion, but the present invention is not limited to the motion detection algorithm, but motion detection processing based on a background difference according to which the presence of an object other than the motion-detecting subject can also be detected, and motion detection processing using e.g. a human presence sensor without using an image may be carried out.

A description will now be given of a user interface screen displayed in the detecting parameter setting operating section 2123 of the setting terminal 2120 with reference to FIG. 19. FIG. 19 is a view showing an example of the user interface screen displayed in the detecting parameter setting operating section 2123 of the setting terminal 2120 in FIG. 18.

The user interface screen (GUI screen) in FIG. 19 is displayed in the detecting parameter setting operating section 2123 so that the operator of the setting terminal 2120 can make settings on the screen. The user interface screen is comprised of an image display panel 2210 and a motion detection setting panel 2220. Displayed on the image display panel 2210 are an image display section 2211 which actually displays an image from the image display section 2121, rectangles (blocks) 2212 for specifying a region where a motion is to be detected, and buttons 2213 and 2214 for selectively enabling or disabling a motion detecting function. The positions and size of the rectangles 2212 can be arbitrarily set on the user interface screen by means of a pointing device or the like.

Displayed on the motion detection setting panel 2220 are a saving start button 2223, a reproducing button 2224, time setting sections 2221 and 2222, a sensitivity setting slide bar 2225, an area setting slide bar 2226, a detected area bar 2227, and an application button 2228. The saving start button 2223 is for giving an instruction for starting temporarily storing an image in the image temporary storage section 2124. The reproducing button 2224 is for giving an instruction for reproducing an image which is temporarily stored in the image temporary storage section 2124. The time setting section 2221 is for designating a delay time after the depression of the saving start button 2223 and before the actual start of image storage, and the time setting section 2222 is for designating the length (duration) of an image which is to be temporarily stored.

The sensitivity setting slide bar 2225 is for setting the sensitivity. The set sensitivity is compared with a difference in brightness of the same pixel between adjacent frames of an image, and if the difference is equal to or greater than the sensitivity, it is determined that there has been a variation in the pixel. The area setting slide bar 2226 is for setting the ratio of pixels i.e. the ratio of an area for which it is determined that there has been a variation within a region specified by the rectangles 2212. If the ratio of an area for which it is determined that there has been a variation exceeds the set area ratio, it is determined that a motion has been eventually detected. The detected area bar 2227 is for displaying the ratio of pixels, for which it has been determined that there has been a variation, as the length of a bar, and is configured such that whether a motion has been detected or not is discriminated according to the color of the bar. For example, if no motion has been detected, the bar is displayed in green, and if a motion has been detected, the bar is displayed in red. The display of the bar is updated for each frame of an image. If the length of the bar corresponds to 0%, it is determined that there has not been a variation in any of the pixels, and if the length of the bar corresponds to 100%, it is determined that there has been a variation in all the pixels.

The application button 2228 is for fixing parameters set on the motion detection setting panel 2220. When the application button 2228 is depressed, the set sensitivity and the set area are set in the detecting parameter holding section 2128 of the setting terminal 2120, and are transmitted to the camera server 2110 via the communication control section 2127. As a result, the values set in the detecting parameter holding section 2115 of the camera server 2110 are updated.

Figure 20A:
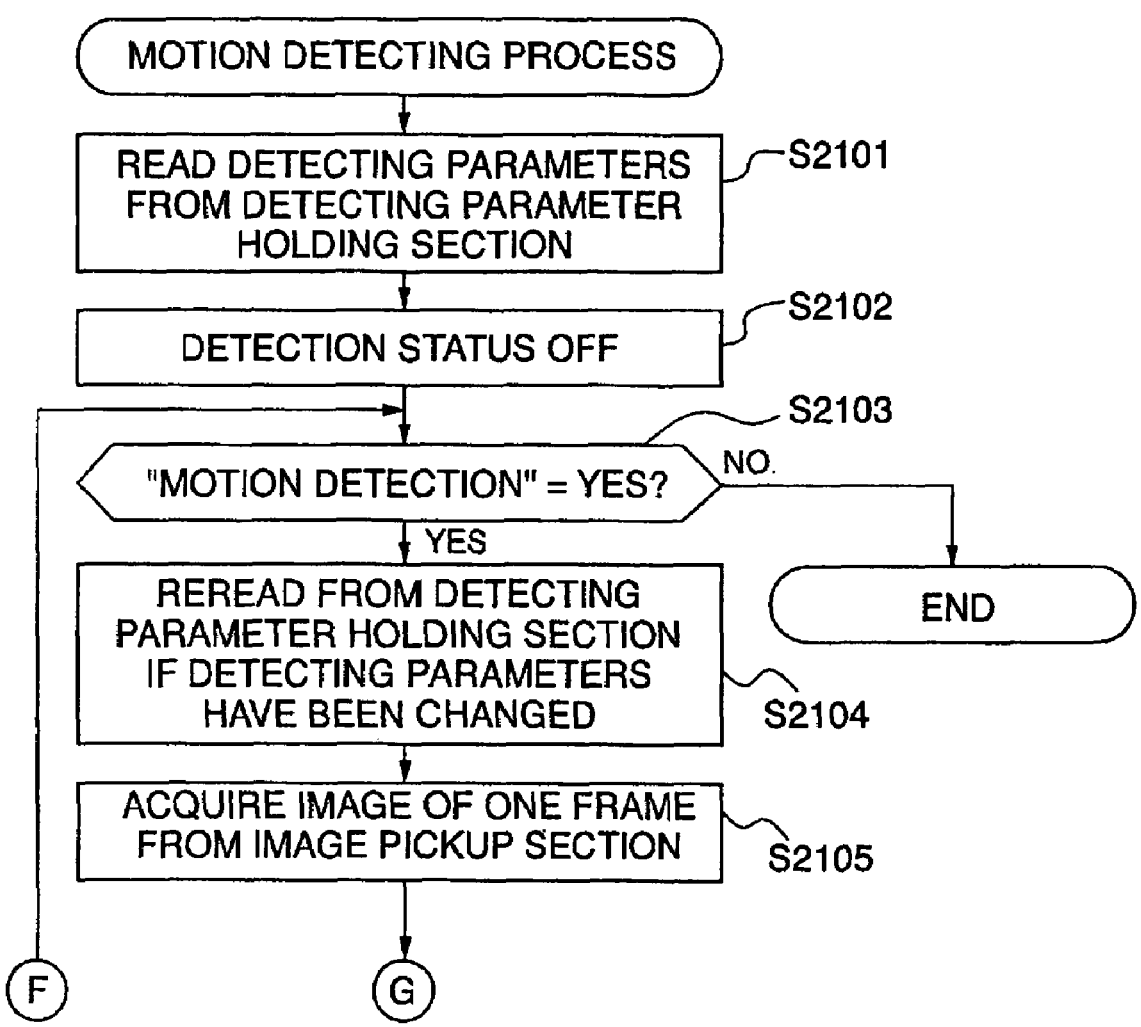
FIGS. 20A and 20B are flow chart showing a motion detecting process carried out by a motion detecting section of the camera server and a motion detecting section of the setting terminal.
Figure 20B:
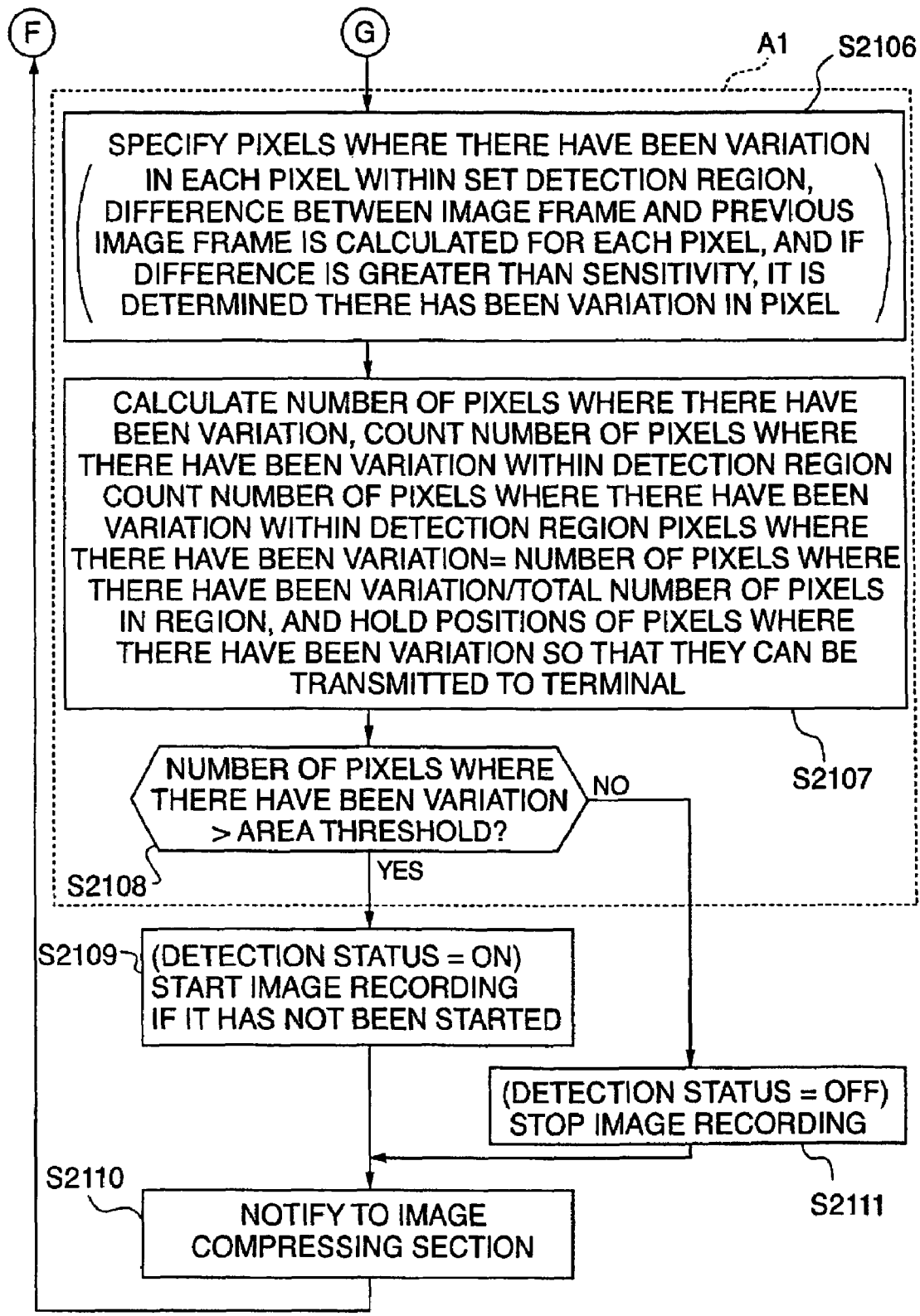

A description will now be given of a motion detecting process carried out by the motion detecting section 2113 of the camera server 2110 and the motion detecting section 2122 of the setting terminal 2120 with reference to FIGS. 20A and 20B. FIGS. 20A and 20B are flow chart showing the motion detecting process carried out by the motion detecting section 2113 of the camera server 2110 and the motion detecting section 2122 of the setting terminal 2120. The motion detecting section 2113 of the camera server 2110 and the motion detecting section 2122 of the setting terminal 2120 carry out the motion detecting process in accordance with the same algorithm, and hence in the following description, the motion detecting process carried out by the detecting section 2113 of the camera server 2110 will be taken as an example.

The motion detecting section 2113 of the camera server 2110 is activated when the button 2213 out of the buttons 2213, 2214 of the setting terminal 2120 is depressed to change the setting as to the motion detection from "a motion is not to be detected" to "a motion is to be detected".

As shown in FIG. 20A, first, in a step S2101, detecting parameters are read into the motion detecting section 2113 from the detecting parameter holding section 2115, and then in a step S2102, the status of detection is set to "OFF". Then, in a step S2103, it is determined whether the button 2213 has been depressed or not, i.e. whether a motion is to be detected or not. If the button 2213 has not been depressed, it is determined that a motion is not to be detected, and the process is terminated.

On the other hand, if the button 2213 has been depressed, it is determined that a motion is to be detected, and the process proceeds to a step S2104 wherein values set in the detecting parameter holding section 2115 are referred to. If the values have been updated, the values are read again. Then, in a step S2105, an image of one frame is acquired from the image pickup section 2111.

Then, in a step S2106, the acquired frame and a preceding frame are compared with each other to specify pixels where there has been a variation in a region of the rectangles 2212 (a specified detection region). Then, in a step S2107, the pixels in the detection region are counted to calculate the area where there has been a variation, and the positions of the pixels for which it is determined that there has been a variation are temporarily stored. It is then determined whether or not the area calculated in the step S2107 is greater than a value which is set using the area setting slide bar 2226. If the area is greater than the set value, the status of detection is set to "ON" to start image recording in a step S2109. The process then proceeds to a step S2110. On the other hand, if the area is not greater than the set value, the status of detection is set to "OFF" to stop image recording. The process then proceeds to the step S2110.

In the step S2110, the image compressing section 2112 is notified that image recording has been started or stopped. The process then returns to the step S2103.

In the above process, a part indicated by "A1" (steps S2106 to S2108) in FIG. 20B corresponds to an algorithm for the motion detection processing. It should be noted that whether or not there has been a motion should not necessarily be determined for each pixel of an image frame, but may be determined for each block comprised of a predetermined number of pixels as representative pixels. For example, whether there has been a variation or not is determined for units of 8×8 pixels i.e. JPEG macro-blocks to obtain information indicative of the positions of pixels where there has been a variation. Actually, the region specified by the rectangles 2212 is displayed as above.

Figure 21:
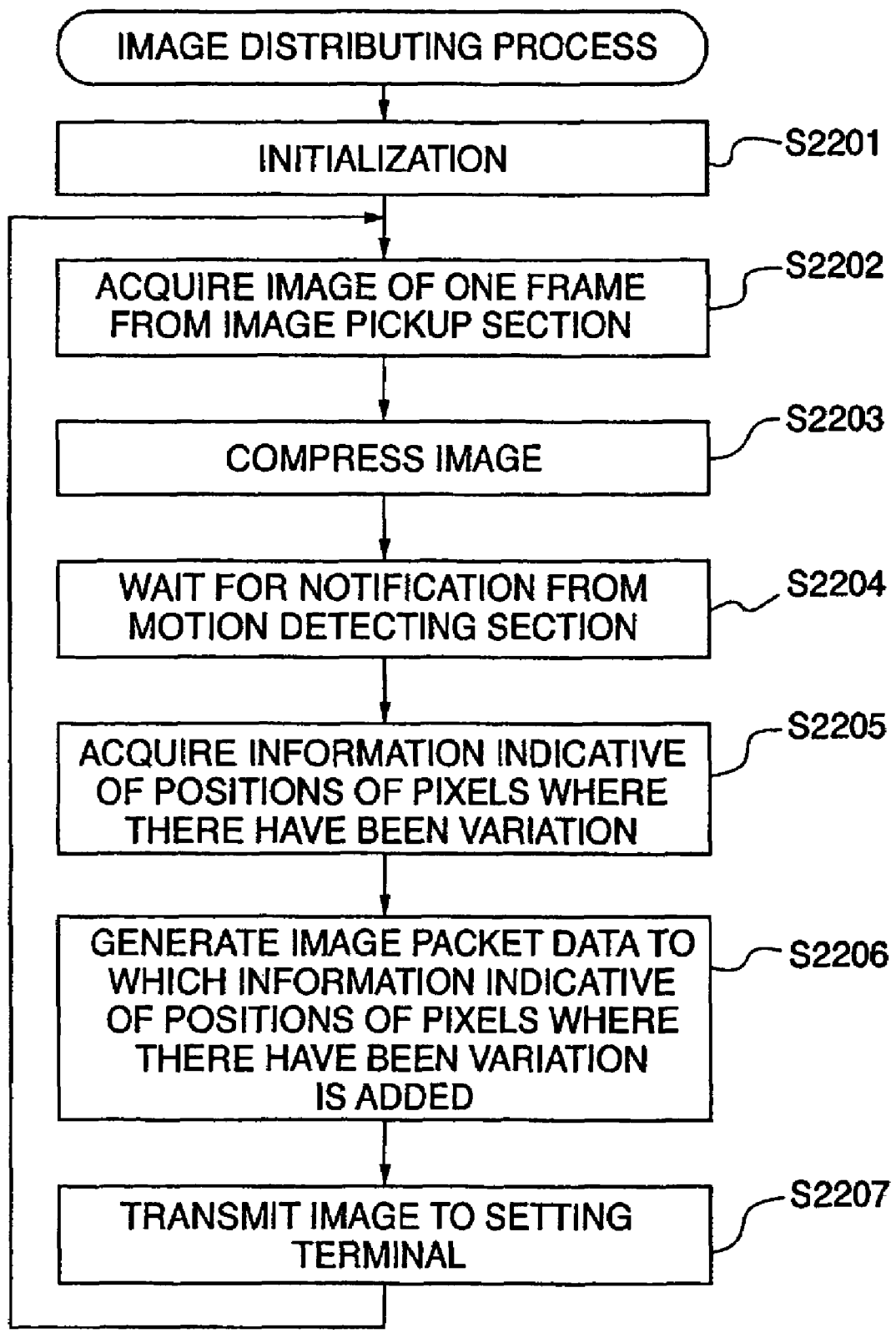
FIG. 21 is a flow chart showing an image distributing process carried out by the camera server.

A description will now be given of an image distributing process carried out by the camera server 2110 in FIG. 18 with reference to FIG. 21. FIG. 21 is a flow chart showing the image distributing process carried out by the camera server 2110. The process in the flow chart of FIG. 21 as well as the process in the flow chart of FIGS. 20A and 20B is carried out in the camera server 2110.

As shown in FIG. 21, in the camera server 2110, first, initialization is carried out in a step S2201. Then, in a step S2202, an image of one frame is acquired from the image pickup section 2111. The acquired image is compressed in a step S2203.

Then, in a step S2204, a notification from the motion detecting section 2113 (the notification in the step S2110 in FIG. 20B) is awaited, and in a step S2205, the information indicative of the positions of pixels where there has been a variation, which has been temporarily stored in the step S2107, is taken out and added to the compressed image signal. Then, in a step S2206, the compressed image signal, to which the information indicative of the positions of pixels where there has been a variation has been added, is converted into packet data in such a format that the data can be transmitted to the network 2130. The information indicative of the positions of pixels where there has been a variation is binary-compressed as a 1-bit binary image by run length coding, and is transmitted together with the compressed image.

Then, in a step S2207, the packet data is transmitted from the communication control section 2116 to the setting terminal 2120 via the network 2130. In the setting terminal 2120, the information indicative of the positions of pixels where there has been a variation is superimposed on the image, but if no motion has been detected, the information indicative of the positions of pixels where there has been a variation has no contents, and hence an image as information indicative of the positions of pixels where there has been a variation is not superimposed on the image.

Figure 23B:
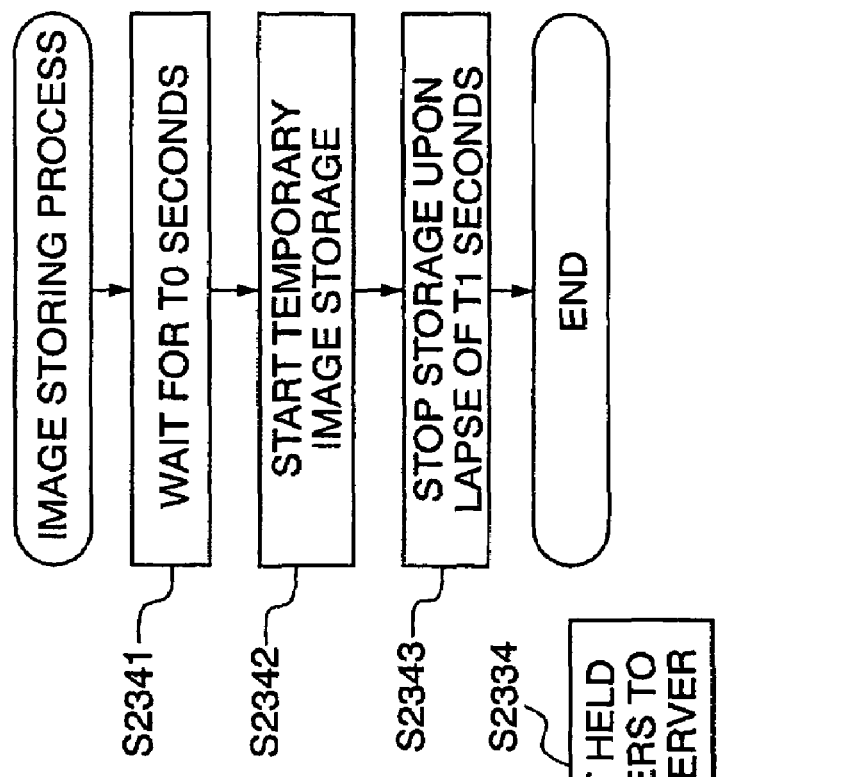
FIG. 23B is a flow chart showing an image storage process carried out by the setting terminal.
Figure 23A:
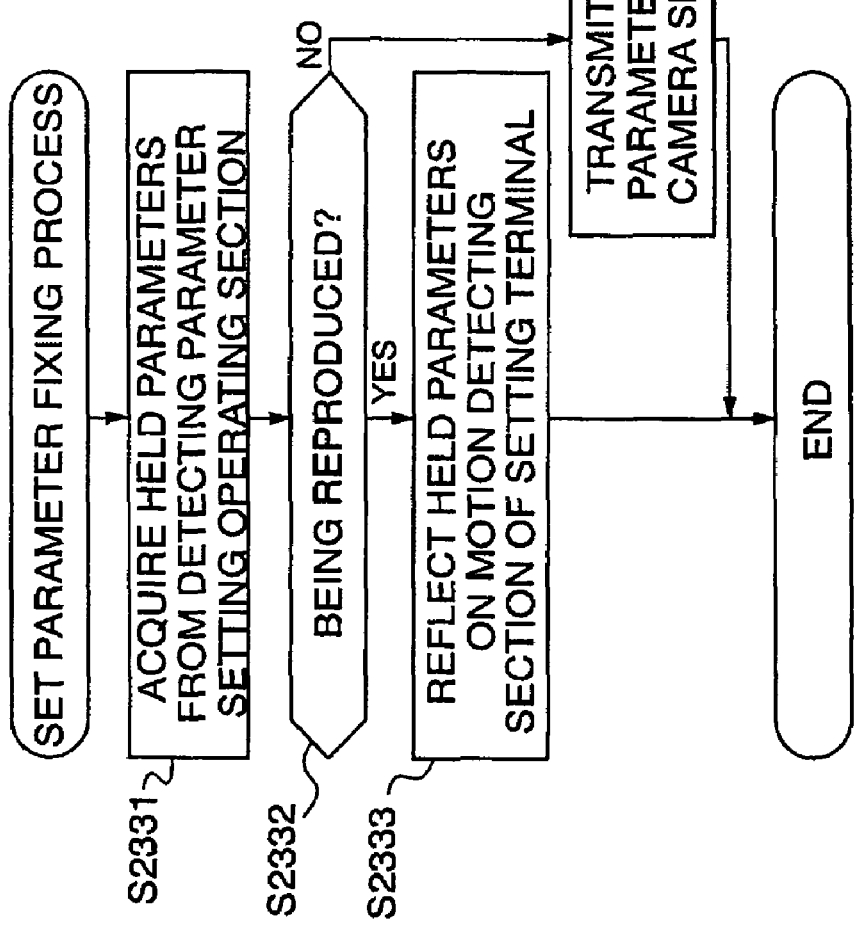
FIG. 23A is a flow chart showing a set parameter fixing process carried out by the setting terminal.
Figure 24:
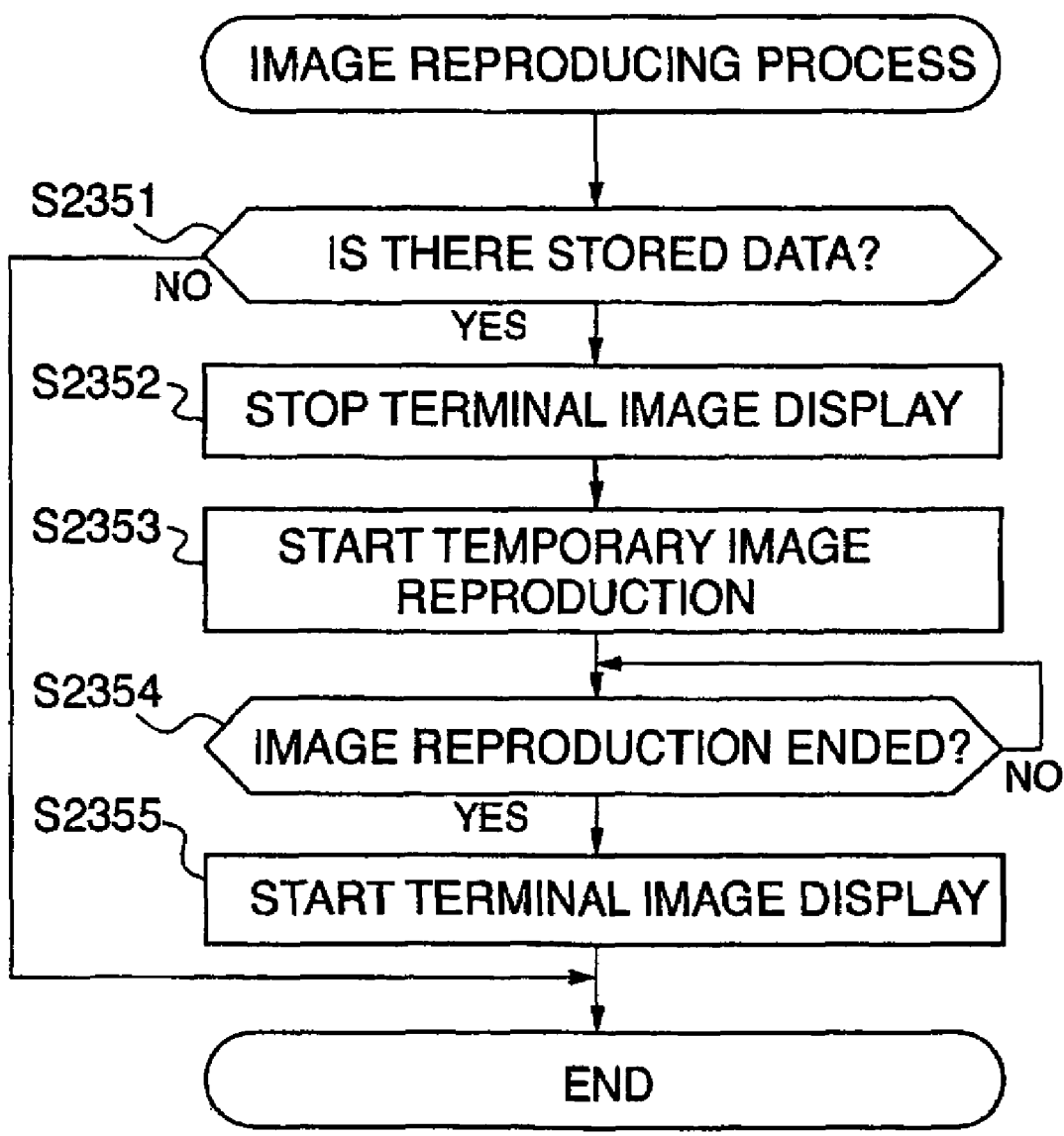
FIG. 24 is a flow chart showing an image reproducing process carried out by the setting terminal.

A description will now be given of processes carried out by the setting terminal 2120 with reference to FIGS. 22A to 24. FIG. 22A is a flow chart showing a main process, FIG. 22B is a flow chart showing a motion detecting instruction notifying process, FIG. 22C is a flow chart showing a parameter changing process, FIG. 23A is a flow chart showing a set parameter fixing process, FIG. 23B is a flow chart showing an image storing process, and FIG. 24 is a flow chart showing an image reproducing process.

As shown in FIG. 22A, in the setting terminal 2120, first, initialization is carried out in a step S2301. Then, in a step S2302, it is determined whether the setting terminal 2120 has been normally connected to the camera server 2110. If the setting terminal 2120 has not been normally connected to the camera server 2110, the process is terminated. On the other hand, if the setting terminal 2120 has been normally connected to the camera server 2110, the process proceeds to a step S2303 wherein the GUI (Graphical User Interface) screen in FIG. 19 is displayed in the detecting parameter setting operating section 2123. Then, in a step S2304, the display of an image on the image display panel 2210 of the GUI screen is started.

Then, in a step S2305, an operation on the GUI screen is awaited, and in a step S2306, processing is carried out according to the operation on the GUI screen. Then, the process returns to the step S2305.

If the "YES" button 2213 or the "NO" button 2214 is depressed as the operation on the GUI screen, the process proceeds to a step S2311 wherein the camera server 2210 is notified that a motion is to be detected or is not to be detected as shown in FIG. 22B. According to this notification, a determination is made in the step S2103 in FIG. 20A.

If the sensitivity setting slide bar 2225 or the area setting slide bar 2226 is operated as the operation on the GUI screen, the process proceeds to a step S2321 wherein values (parameters) held in the detecting parameter setting operating section 2123 are updated to values set through the operation of the sensitivity setting slide bar 2225 or the area setting slide bar 2226 as shown in FIG. 22C.

If the application button 2228 is depressed as the operation on the GUI screen, the process proceeds to a step S2331 wherein values (parameters) held in the detecting parameter setting operating section 2123 are acquired as shown in FIG. 23A. Then, in a step S2332, it is determined whether an image stored in the image temporary storage section 2124 is being reproduced or not. If the image stored in the image temporary storage section 2124 is being reproduced, the process proceeds to a step S2333 wherein values (parameters) held in the detecting parameter holding section 2128 are updated to the values (parameters) acquired in the step S2331. On the other hand, if the image stored in the image temporary storage section 2124 is not being reproduced, the values (parameters) acquired in the step S2331 are transmitted to the camera server 2110. As a result, the values (parameters) held in the detecting parameter holding section 2115 of the camera server 2110 are updated to the values (parameters) acquired in the step S2331.

If the saving start button 2224 is depressed as the operation on the GUI screen, as shown in FIG. 23B, the process proceeds to a step S2341 wherein the lapse of a storage start delay time period T0 set in the time setting section 2221 is awaited, and then proceeds to a step S2342 wherein the temporary storage of an image is started. Then, in a step S2343, part of the image corresponding to a length T1 set by the time setting section 2222 is stored. It should be noted that during the storage of the image, only an image part of the entire image frame having reached the communication processing section 2127 is stored in the image temporary storage section 2124 without being expanded.

If the reproducing button 2223 is depressed as the operation on the GUI screen, it is determined in a step S2351 whether any image data is stored in the image temporary storage section 2124 or not as shown in FIG. 24. If any image data is stored in the image temporary storage section 2124, the display of an image signal from the camera server 2110 is stopped in a step S2352, and then the reproduction of an image signal stored in the image temporary storage section 2124 is started in a step S2353. Then, in a step S2354, the end of image reproduction is awaited, and then, if image reproduction ends, in a step S2355, the display of the image signal from the camera server 2110 is resumed.

It should be noted that in the above described storage starting process (shown in FIG. 23B) and in the processing carried out in response to the depression of the reproducing button 2223 (shown in FIG. 24), it is possible to set parameters for use in detecting a motion (asynchronous).

Figure 25:
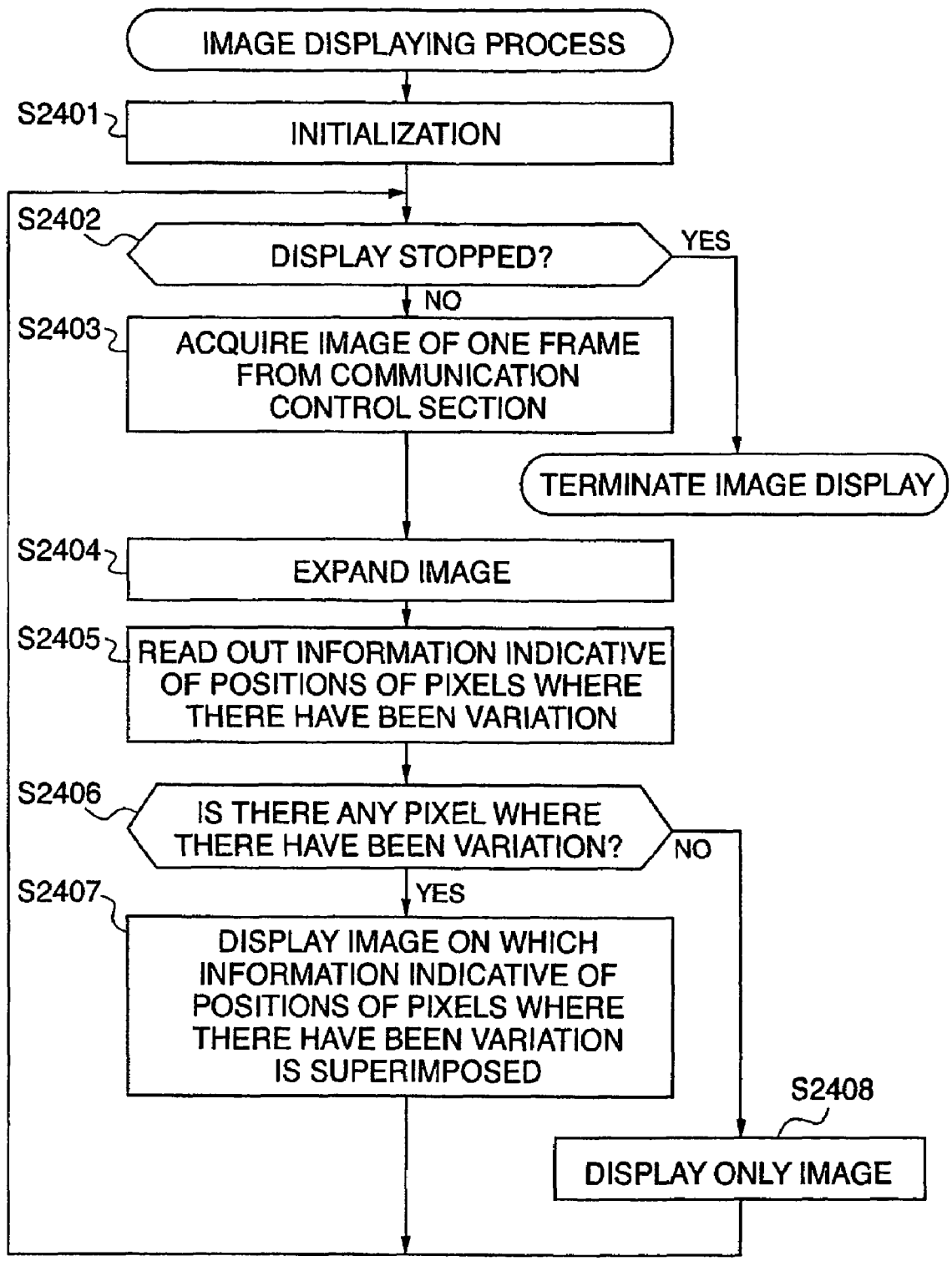
FIG. 25 is a flow chart showing an image displaying process carried out by the setting terminal.

A description will now be given of an image displaying process carried out by the setting terminal 2120 with reference to FIG. 25. FIG. 25 is a flow chart showing the image displaying process carried out by the setting terminal 2120 in FIG. 18.

When an image transmitted from the camera server 2110 is received by the setting terminal 2120 which is in an active state, the image displaying process is automatically started. In the image displaying process, as shown in FIG. 25, initialization is carried out in a step S2401, and it is then determined in a step S2402 whether image display is to be stopped or not. If image display is to be stopped, the process is terminated.

On the other hand, if image display is not to be stopped, an image signal of one frame is acquired from the communication control section 2127 in a step S2403, and the acquired image signal is expanded in a step S2404. Then, in a step S2405, information indicative of the positions of pixels where there has been a variation is read out.

Then, in a step S2406, whether or not there are any pixels where there has been a variation is determined according to the information read out in the step S2405. If there are any pixels where there has been a variation, the process proceeds to a step S2407 wherein the pixels where there has been a variation are superimposed on the image such that whether there has been a variation or not is indicated in units of blocks within a range specified by the rectangles 2212. It should be noted that in the example shown in FIG. 19, whether there has been a variation or not is indicated in units of 8×8 blocks. On the other hand, if the information indicative of the positions of pixels where there has been a variation has no contents, only the image is displayed in a step S2408.

Figure 26:
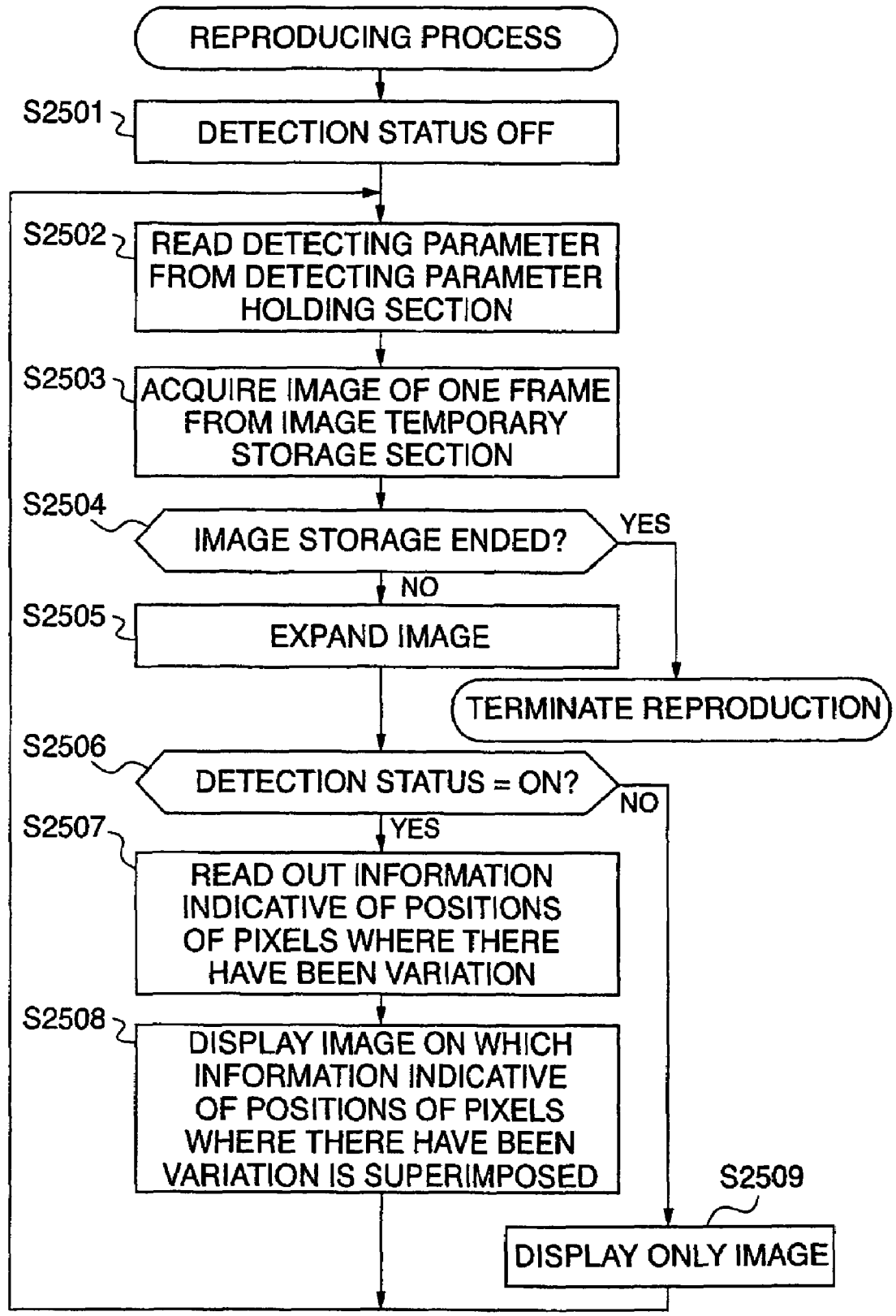
FIG. 26 is a flow chart showing a reproducing process carried out by the setting terminal.

A description will now be given of a reproducing process carried out by the setting terminal 2120 in FIG. 18 with reference to FIG. 26. FIG. 26 is a flow chart showing the reproducing process carried out by the setting terminal 2120. The reproducing process is carried out in accordance with the same algorithm as the process shown in FIGS. 20A and 20B.

In the reproducing process, as shown in FIG. 26, first, the status of detection is set to "OFF" in a step S2501. Then, in a step S2502, parameters are read from the detecting parameter holding section 2128, and in a step S2503, an image signal of one frame is acquired from the image temporary storage section 2124.

Then, in a step S2504, a control part of the setting terminal 2120 determines whether the readout of the stored image has been completed or not. If the readout of the stored image has been completed, the process is terminated. On the other hand, if the readout of the stored image has not been completed, the acquired image signal is continuously expanded in a step S2505. Then, in a step S2506, the motion detecting section 2122 carries out a motion detecting process according to the same procedure as shown in the block indicated by "A1" in FIG. 20B.

Then, in as step S2506, it is determined whether as a result of the motion detecting process, the status of detection is "ON" or not. If the status of detection is "ON", information indicative of the positions of pixels where there has been a variation is read out from the motion detecting section 2122 in a step S2507, and the information is then superimposed on the image in a step S2508. The process then returns to the step S2502. On the other hand, if the status of detection is "OFF", only the image is displayed in a step S2509.

As described above, according to the present embodiment, when parameters for the motion detecting processing carried out by the camera server 2110 are set, the parameters for the motion detection processing can be set while an image which is temporarily stored in the image temporary storage section 2124 of the setting terminal 2120 is being reproduced, and hence it is possible to easily set proper parameters without carrying out additional operations. Specifically, if a person who makes settings for the motion detection processing goes directly to a position in front of a camera, makes an action that simulates an abnormal operation and temporarily records an image representing the simulating action, and subsequently sets parameters while reproducing the image representing the simulating action, it is possible for a single person to set parameters for the motion detection processing, and there is no necessity of asking another person to simulate an abnormal operation in front of the camera as in the prior art, or there is no necessity of carrying out complicated setting operations such as preparation of a video recording apparatus.

Although in the present embodiment, the camera server 2110 and the setting terminal 2120 are connected to each other via the network 2130, the present invention is not limited to this, but it may be configured such that an analog image signal is output from the camera server 2110 to the setting terminal 2110 via an image cable, and setting information is exchanged using a control signal cable such as RS-232C.

Figure 27:
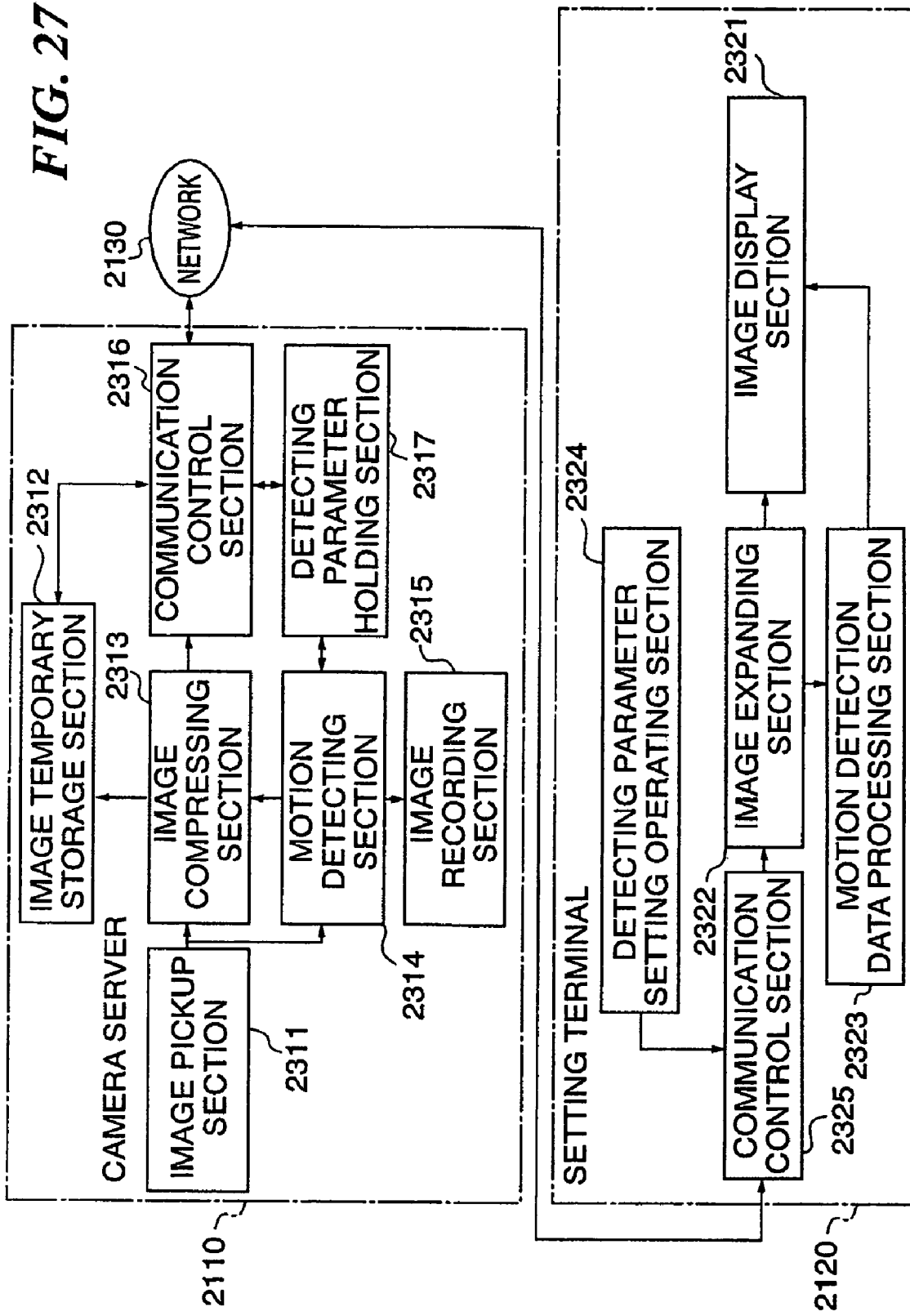
FIG. 27 is a block diagram showing the arrangement of a motion detection system according to a sixth embodiment of the present invention.
Figure 28B:
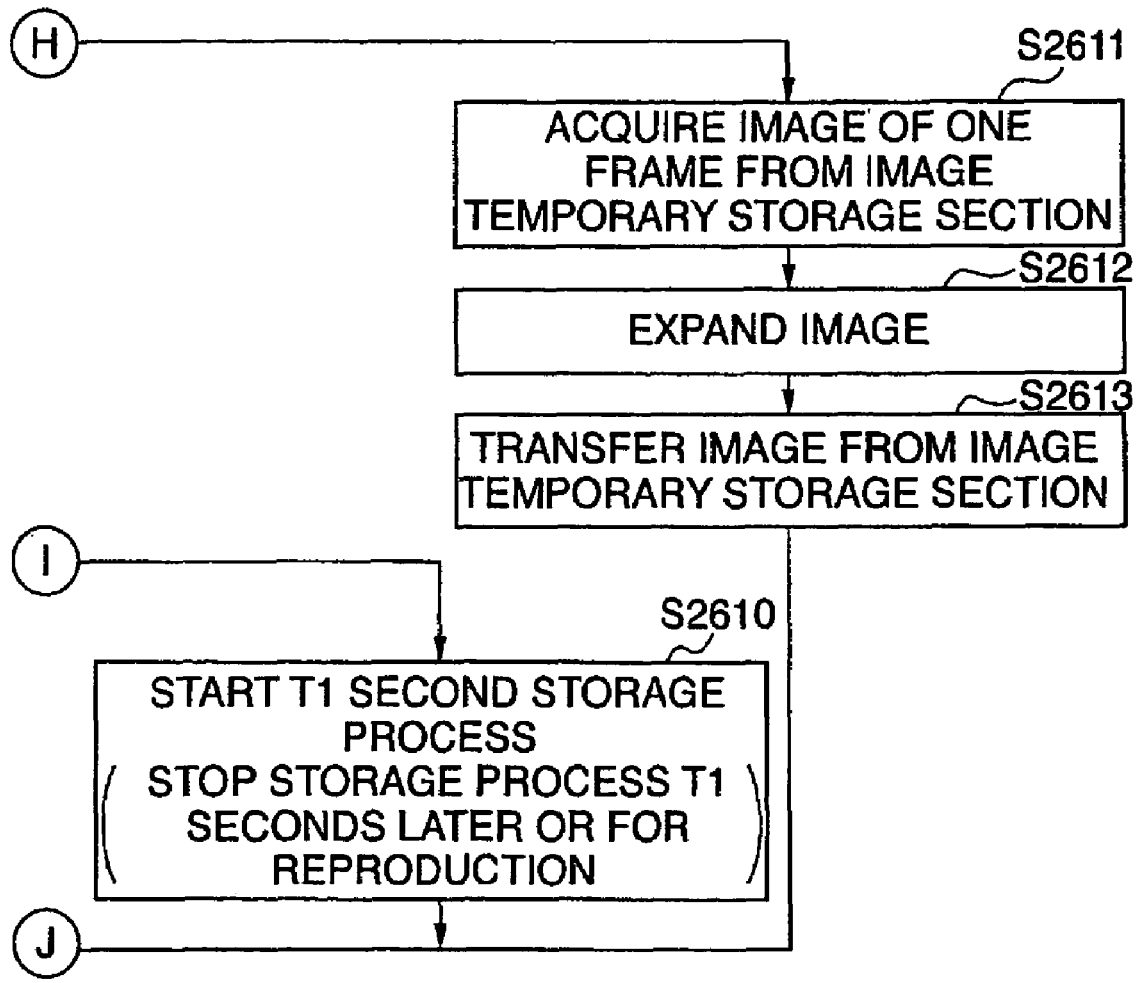
Figure 29A:
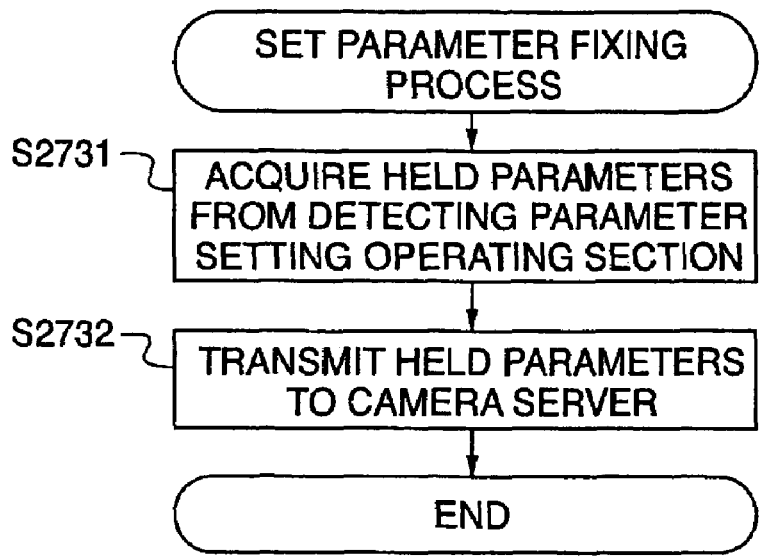
FIG. 29A is a flow chart showing a set parameter fixing process carried out by the setting terminal.
Figure 29B:
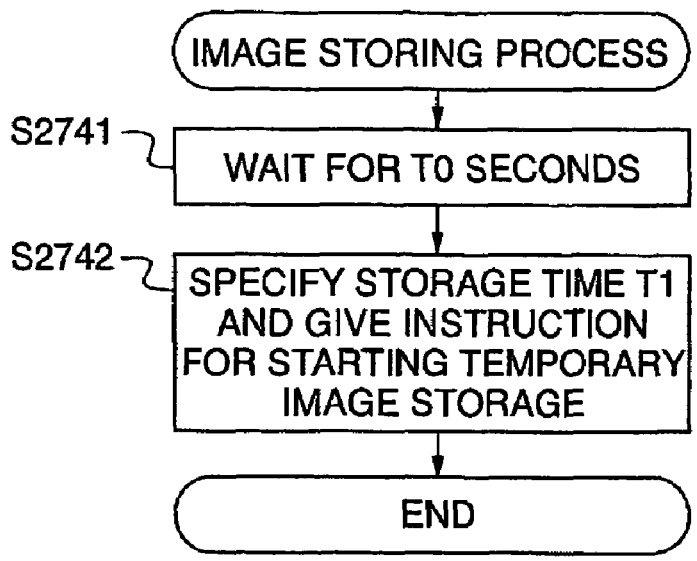
FIG. 29B is a flow chart showing an image storage process carried out by the setting terminal.
Figure 29C:
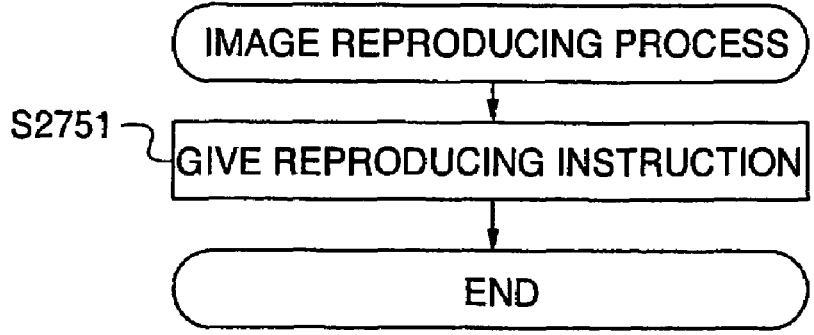
FIG. 29C is a flow chart showing an image reproducing process carried out by the setting terminal.

A description will now be given of a sixth embodiment of the present invention with reference to FIGS. 27 to 29C. FIG. 27 is a block diagram showing the arrangement of a motion detecting system according to the sixth embodiment, FIGS. 28A and 28B are flow chart showing an image distributing process carried out by the camera server 2110 appearing in FIG. 27, FIG. 29A is a flow chart showing a set parameter fixing process, FIG. 29B is a flow chart showing an image storing process, and FIG. 29C is a flow chart showing an image reproducing process.

The present embodiment is different from the above described fifth embodiment in that an image temporary storage section for temporarily storing an image to be distributed to the setting terminal 2120 is provided in the camera server 2110. Therefore, parameters for the motion detection processing carried out by the camera server 2110 can be determined while an image stored in the image temporary storage section is being reproduced.

Specifically, as shown in FIG. 27, the camera server 2110 is comprised of an image pickup section 2311, an image compressing section 2313, a motion detecting section 2314, an image recording section 2315, a detecting parameter holding section 2317, a communication control section 2316, as well as an image temporary storage section 2312 for temporarily storing an image signal when a motion is detected. The image pickup section 2311, image compressing section 2313, motion detecting section 2314, image recording section 2315, detecting parameter holding section 2317, and communication control section 2316 are identical with those of the corresponding ones in the setting terminal 2120 (FIG. 18) according to the above described fifth embodiment.

Further, the setting terminal 2120 is comprised of a communication control section 2325, an image expanding section 2322, a motion detection data processing section 2323, and an image display section 2321. The setting terminal 2120 according to the present embodiment is not provided with the image temporary storage section 2124 as is distinct from the setting terminal 2120 according to the above described fifth embodiment. Further, the camera server 2110 according to the present embodiment is provided with the image temporary storage section 2312 as is distinct from the camera server 2110 according to the fifth embodiment.

A description will now be given of the image distributing process carried out by the camera server 2110 with reference to FIGS. 28A and 28B.

In the camera server 2110, as shown in FIG. 28A, first, initialization is carried out in a step S2601. Then, in a step S2602, it is determined whether a temporarily stored image signal is being reproduced or not. If the temporarily stored image signal is not being reproduced, an image of one frame is acquired from the image pickup section 2311 in a step S2603, and the acquired image is compressed in a step S2604. Then, it is determined in a step S2605 whether an instruction for temporarily storing the compressed image signal has been given or not.

If it is determined in the step S2605 that the instruction for temporarily storing the compressed image signal has been given, the process proceeds to a step S2610 wherein the storage (T1 sec. storage) of the compressed image signal into the image temporary storage section 2312 is started upon the lapse of a delay time T0. The process then proceeds to a step S2606. On the other hand, if it is determined in the step S2605 that the instruction for temporarily storing the compressed image signal has not been given, the process proceeds to the step S2606.

In the step S2606, a notification from the motion detecting section 2314 is awaited, and then in a step S2607, information indicative of the positions of pixels where there has been a variation is acquired from the motion detecting section 2314. Then, in a step S2608, the acquired information is added to the compressed image signal, which is then converted into packet data in such a format that the data can be transmitted to the network 2130. The information indicative of the positions of pixels where there has been a variation is binary-compressed as a 1-bit binary image by run length coding, and is transmitted together with a compressed image.

Then, in a step S2609, the packet data is transmitted from the communication control section 2316 to the setting terminal 2120 via the network 2130. The process then returns to the step S2602.

Here, if the storage is started in the step S2610, the storage (recording) is stopped upon the lapse of a period of time T1 (sec.) corresponding to the length of the image to be stored. The delay time period T0 (sec.) and the period of time T1 (sec.) as the length of the stored image are values specified by the time setting sections 2221 and 2222 in FIG. 19, and they are transmitted from the setting terminal 2120 to the camera server 2110 when the saving start button 2223 is depressed. It is configured such that a flag for starting temporary storage is set on this occasion, and the status of the flag is checked in the step S2605.

If it is determined in the step S2602 that an instruction for reproducing the stored data has been given, an image of one frame is acquired from the image temporary storage section 2312 in a step S2611, and the acquired image is expanded in a step S2612. Then, in a step S2613, the motion detection processing is carried out using the image expanded in the step S2612. Specifically, the motion detection processing is carried out using the temporarily stored image (refer to FIGS.

20A and 20B) instead of acquiring an image from the image pickup section in the step S2105 according to the fifth embodiment. The process then proceeds to the step S2606.

It should be noted that the instruction for reproducing the stored data is transmitted from the setting terminal 2120 to the camera server 2110 when the reproducing button 2224 appearing in FIG. 19 is depressed. It is configured such that a flag for reproduction of the stored data is set on this occasion, and the status of the flag is checked in the step S2602.

A description will now be given of the processes carried out in response to the operation of the detecting parameter setting operating section 2324 of the setting terminal 2120 with reference to FIGS. 29A to 29C. Here, a description will only be given of differences between the present embodiment and the above described fifth embodiment.

If the application button 2228 is depressed as the operation on the GUI screen, the process proceeds to a step S2731 wherein values (parameters) held in the detecting parameter setting operating section 2324 are acquired as shown in FIG. 29A. Then, in a step S2732, the values (parameters) acquired in the step S2731 are transmitted to the camera server 2110. As a result, the values (parameters) held in the detecting parameter holding section 2317 of the camera server 2110 are updated to the values (parameters) acquired in the step S2731.

If the saving start button 2224 is depressed as the operation on the GUI screen, as shown in FIG. 29B, the lapse of the storage starting delay time period T0 set by the time setting section 2221 appearing in FIG. 19 is awaited in a step S2741, and then, in a step S2742, the camera server 2110 is instructed to start storing part of an image corresponding to the set image length (referred to as T1 seconds), i.e. to "start storage for T1 seconds".

If the reproducing button 2223 is depressed as the operation on the GUI screen, as shown in FIG. 29C, the process proceeds to a step S2751 wherein the camera server 2110 is instructed to start reproducing an image stored in the temporary storage section 2312, i.e. to start "reproducing the stored data".

In this way, according to the present embodiment, the same effects can be obtained as in the above described fifth embodiment.

It goes without saying that the object of the present invention may also be accomplished by supplying a system or an apparatus with a storage medium (or a recording medium) in which a program code of software which realizes the functions of any of the above described embodiments is stored, and causing a computer (or CPU, MPU, or the like) of the system or apparatus to read out and execute the program code stored in the storage medium.

In this case, the program code itself read from the storage medium realizes the functions of any of the above described embodiments, and hence the program code and a storage medium in which the program code is stored constitute the present invention.

Examples of the storage medium for supplying the program code include a RAM, an NV-RAM, a floppy (registered trademark) disk, a hard disk, an optical disk, a magnetic-optical disk, a CD-ROM, a CD-R, a CD-RW, a DVD-ROM, a DVD-RAM, a DVD-RW, a DVD+RW, a magnetic tape, a nonvolatile memory card, a ROM, and an EEPROM. Alternatively, the program code may be downloaded via a network.

Further, it goes without saying that the functions of any of the above described embodiments may be accomplished not only by executing the program code read out by a computer, but also by causing an OS (operating system) or the like which operates on the computer to perform a part or all of the actual operations based on instructions of the program code.

Further, it goes without saying that the functions of any of the above described embodiments may be accomplished by writing the program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

What is claimed is:

1. A motion detecting system, comprising:
a camera server; and
a setting terminal connected to said camera server for communication with each other via a network;
wherein:
said camera server comprises a first motion detecting device that carries out motion detection processing based on a first set value used to determine a variation in an image taken by a camera; and
said setting terminal comprises an image acquisition device that acquires the image taken by the camera from said camera server via said network, a second motion detecting device that carries out the motion detection processing on the image acquired by said image acquisition device based on a second set value, and a set value changing device that transmits the second set value to said camera server so as to change the first set value to the second set value according to a result of the motion detection processing carried out by said second motion detecting device.

2. A motion detecting system according to claim 1, wherein said setting terminal comprises a detection result acquisition device that acquires a result of the motion detection processing carried out by said first motion detecting device of said camera server via said network, and a display device that selectively displays one of the result of the motion detection processing acquired by said detection result acquisition device and the result of the motion detection processing carried out by said second motion detecting device of said setting terminal.

3. A motion detecting system according to claim 1, wherein said setting terminal comprises a detection result acquisition device that acquires a result of the motion detection processing carried out by said first motion detecting device of said camera server via said network, and a display device that simultaneously displays the result of the motion detection processing acquired by said detection result acquisition device and the result of the second motion detection processing carried out by said second motion detecting device of said setting terminal.

4. A motion detecting system according to claim 1, wherein:
said first motion detecting device of said camera server carries out the first motion detection processing in accordance with a specified schedule; and
said setting terminal comprises a display device that displays a result of the motion detection processing carried out by said first motion detecting device of said camera server, a schedule specifying device that specifies a schedule for the motion detection processing carried out by said first motion detecting device of said camera server via said network, and a display nullifying device operable when a present time is outside a range of the schedule specified for the motion detection processing carried out by said first motion detecting device of said camera server, to nullify a display of the result of the motion detection processing carried out by said first motion detecting device of said camera server.

5. A motion detecting system according to claim 4, wherein said setting terminal comprises a forced operation requesting device that requests said camera server, via said network, to ignore the schedule specified for the motion detection processing and to force said first motion detecting device to carry out the motion detection processing, and said camera server comprises a forcing device that forces said first motion detecting device to carry out the motion detection processing in accordance with a request from said forced operation requesting device.

6. A motion detecting system according to claim 5, wherein said set value changing device is operable when said forced operation requesting device makes the request, to change the first set value used by said camera server.

7. A motion detecting system according to claim 2, wherein said setting terminal comprises a display nullifying device that nullifies a display of the result of said motion detection processing carried out by said second motion detecting device of said setting terminal when said setting terminal and said camera server are different in frame rate from each other.

8. A motion detecting system according to claim 1, wherein said setting terminal comprises a setting device that sets a time at which an image is acquired so as to carry out the motion detection processing on the image based on the first set value at said camera server, and a period of time for which the image is acquired.

9. A motion detecting setting method using a setting terminal and a camera server for communication with each other via a network, comprising:
    an image acquisition step of causing the setting terminal to acquire the image taken by the camera from the camera server via the network, wherein the camera server carries out motion detection processing based on a first set value used to determine a variation in an image taken by a camera;
    a motion detecting step of causing the setting terminal to carry out the motion detection processing on the image acquired in said image acquisition step based on a second set value;
    a display step of causing the setting terminal to display a result of the motion detection processing carried out by said setting terminal; and
    a transmitting step of causing the setting terminal to transmit the second set value so as to change the first set value to the second set value.

10. A motion detecting setting method according to claim 9, comprising a detection result acquisition step of causing the setting terminal to acquire a result of the motion detection processing carried out by the camera server via the network, and wherein one of the result of the motion detection processing acquired in said detection result acquisition step and the result of the motion detection processing carried out by said second motion detecting device of said setting terminal is selectively displayed in said display step.

11. A motion detecting setting method according to claim 9, comprising a detection result acquisition step of causing the setting terminal to acquire a result of the motion detection processing carried out by the camera server via the network, and wherein the result of the first motion detection processing acquired in said detection result acquisition step and the result of the motion detection processing by said second motion detecting device of said setting terminal is simultaneously displayed in said display step.

12. A motion detecting setting method according to claim 9, wherein a result of the motion detection processing carried out by said camera server is displayed, the method further comprising a schedule specifying step of causing said setting terminal to specify a schedule for the motion detection processing by said camera server via the network, and a display nullifying step of causing the setting terminal to nullify display of the result of the motion detection processing carried out by said camera server, when a present time is outside a range of the schedule specified for the first motion detection processing.

13. A motion detecting setting method according to claim 12, comprising a forced operation requesting step of causing the setting terminal to request the camera server, via the network, to ignore the schedule specified for the motion detection processing by said camera server and to be forced to carry out the motion detection processing, and a forcing step of forcing said camera server to carry out the motion detection processing by said camera server in accordance with a request in said forced operation requesting step.

14. A motion detecting setting method according to claim 13, wherein when the request is made in said forced operation requesting step, the first set value is changed in said set value changing step.

15. A motion detecting setting method according to claim 10, comprising a display nullifying step of causing the setting terminal to nullify display of the result of the motion detection processing carried out in said display step when the setting terminal and the camera server are different in frame rate from each other.

16. A motion detecting setting method according to claim 9, comprising a setting device of causing the setting terminal to set a time at which an image is acquired so as to carry out the motion detection processing on the image based on the first set value, and a period of time for which the image is acquired.

17. A motion detecting setting apparatus that sets parameters of a camera server to detect a variation in an image taken by a camera, comprising:
    an acquisition device that acquires the image taken by the camera from the camera server that carries out motion detection processing based on a first set value used to determine a variation in an image taken by a camera;
    a processing device that carries out detection of a variation in the image acquired by said acquisition device based on a second set value and displays a result of the detection of the variation carried out by said processing device; and
    a set value changing device that transmits the second set value to the camera server via a network so as to change the first set value to the second set value.

18. A motion detecting apparatus according to claim 17, further comprising a setting device that sets a time at which an image is acquired so as to carry out the detection of a variation in the image, and a period of time for which the image is acquired.

19. A computer readable medium that stores a program for executing a motion detecting method of setting parameters of a camera server to detect a variation in an image taken by a camera at a motion detecting apparatus via a network, the method comprising:
    an acquisition step of causing the setting terminal to acquire the image taken by the camera from the camera server via a network, wherein the camera server carries out motion detection processing based on a first set value used to determine a variation in an image taken by a camera;
    a motion detecting step of causing the setting terminal to carry out the motion detection processing on the image acquired in said image acquisition step based on a second set value;
    a display step of causing setting terminal to display a result of the motion detection processing carried out by said setting terminal;
    a transmitting step of causing the setting terminal to transmit the second set value so as to change the first set value to the second set value.

* * * * *